US009781246B2

(12) United States Patent
Das et al.

(10) Patent No.: US 9,781,246 B2
(45) Date of Patent: Oct. 3, 2017

(54) AUGMENTING REALITY USING A SMALL CELL

(71) Applicant: QUALCOMM Incorporated, San Diego, CA (US)

(72) Inventors: Soumya Das, San Diego, CA (US); Edwin Chongwoo Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/839,638

(22) Filed: Aug. 28, 2015

(65) Prior Publication Data

US 2017/0064066 A1 Mar. 2, 2017

(51) Int. Cl.
*H04M 1/725* (2006.01)
*H04W 4/04* (2009.01)
(Continued)

(52) U.S. Cl.
CPC ....... *H04M 1/72533* (2013.01); *H04W 4/043* (2013.01); *G06Q 30/00* (2013.01);
(Continued)

(58) Field of Classification Search
CPC ........... H04M 1/72533; H04M 1/7253; H04M 2250/02; H04W 88/02; G08C 17/02
(Continued)

(56) References Cited

U.S. PATENT DOCUMENTS 6,731,940 B1   5/2004  Nagendran
8,149,095 B2 * 4/2012  Hayashi ................ H04L 12/282
                                                    340/11.1
(Continued)

FOREIGN PATENT DOCUMENTS

EP   2051198 A1   4/2009
EP   2239967 A1   10/2010
(Continued)

OTHER PUBLICATIONS

ISA/EP, International Search Report and Written Opinion of the International Searching Authority, Int'l Application No. PCT/US2016/040009, Oct. 10, 2016, European Patent Office, Rijswijk, NL, 11 pgs.
(Continued)

*Primary Examiner* — Cong Tran
(74) *Attorney, Agent, or Firm* — Holland & Hart LLP

(57) ABSTRACT

A small cell may include a base station that may be co-located with an edge computing device. The edge computing device may be integrated within a small cell base station or be a physically separate module communicatively coupled to and in close proximity with the small cell base station that provides edge computing resources at the small cell. The edge computing device may communicate with input/output devices that are in hyper proximity to the small cell base station. The input/output devices may be capable of sensing aspects of the environment (e.g., via microphones, light sensors, cameras, thermometers, etc.) and providing a stimulus to an individual within hyper proximity to the input-output devices. The stimulus may be in response to or based on the environmental information gathered by the input-output devices.

30 Claims, 13 Drawing Sheets

(51) Int. Cl.
  *H04L 29/08* (2006.01)
  *G06Q 30/00* (2012.01)
  *H04W 4/02* (2009.01)
  *H04W 84/04* (2009.01)
(52) U.S. Cl.
  CPC .............. *H04L 67/20* (2013.01); *H04W 4/02* (2013.01); *H04W 84/045* (2013.01)
(58) Field of Classification Search
  USPC ........................................ 455/418–420, 448
  See application file for complete search history.

(56) References Cited

U.S. PATENT DOCUMENTS

| | | | |
|---|---|---|---|
| 8,271,507 B2 | 9/2012 | Farmer | |
| 8,392,912 B2 | 3/2013 | Davis et al. | |
| 8,750,857 B2 | 6/2014 | Krishnaswamy et al. | |
| 8,798,017 B2* | 8/2014 | Liu .................. | H04W 36/0022 370/338 |
| 9,001,659 B2 | 4/2015 | Sun et al. | |
| 2003/0035464 A1 | 2/2003 | Dehner et al. | |
| 2004/0116115 A1 | 6/2004 | Ertel | |
| 2006/0059044 A1 | 3/2006 | Chan et al. | |
| 2006/0259359 A1 | 11/2006 | Gogel | |
| 2006/0271695 A1* | 11/2006 | Lavian .................. | G06F 21/552 709/229 |
| 2008/0049020 A1 | 2/2008 | Gusler et al. | |
| 2008/0270379 A1 | 10/2008 | Ramakrishna | |
| 2010/0057563 A1 | 3/2010 | Rauber et al. | |
| 2010/0151821 A1 | 6/2010 | Sweeney et al. | |
| 2010/0295676 A1 | 11/2010 | Khachaturov et al. | |
| 2010/0318417 A1 | 12/2010 | Brisebois et al. | |
| 2011/0047030 A1 | 2/2011 | Yoon et al. | |
| 2011/0287787 A1 | 11/2011 | Nagaraja et al. | |
| 2011/0306324 A1 | 12/2011 | Jang et al. | |
| 2012/0016961 A1* | 1/2012 | Tuikka .................. | G06Q 10/10 709/217 |
| 2012/0142319 A1 | 6/2012 | Joshi et al. | |
| 2012/0158816 A1 | 6/2012 | Choi et al. | |
| 2013/0031204 A1 | 1/2013 | Graham et al. | |
| 2013/0054729 A1 | 2/2013 | Jaiswal et al. | |
| 2013/0109371 A1* | 5/2013 | Brogan .................. | G06F 1/1626 455/420 |
| 2013/0110617 A1 | 5/2013 | Phan et al. | |
| 2013/0151654 A1 | 6/2013 | Brech | |
| 2013/0212212 A1 | 8/2013 | Addepalli et al. | |
| 2013/0244612 A1 | 9/2013 | Burckart et al. | |
| 2013/0267252 A1 | 10/2013 | Rosenberg | |
| 2013/0316708 A1 | 11/2013 | MacPherson | |
| 2014/0022920 A1 | 1/2014 | Dua et al. | |
| 2014/0022985 A1 | 1/2014 | Kalmbach et al. | |
| 2014/0098734 A1 | 4/2014 | Kalhan et al. | |
| 2014/0129354 A1 | 5/2014 | Soon-Shiong | |
| 2014/0143438 A1 | 5/2014 | Kagan et al. | |
| 2014/0156793 A1 | 6/2014 | Chan et al. | |
| 2014/0171039 A1 | 6/2014 | Bjontegard | |
| 2014/0173110 A1 | 6/2014 | Uetabira | |
| 2014/0241315 A1 | 8/2014 | Niu et al. | |
| 2014/0297822 A1* | 10/2014 | Agrawal .................. | H04L 41/50 709/223 |
| 2014/0310709 A1 | 10/2014 | Nirantar | |
| 2014/0337458 A1 | 11/2014 | Barton | |
| 2014/0373032 A1 | 12/2014 | Merry et al. | |
| 2015/0046656 A1 | 2/2015 | Blinick et al. | |
| 2015/0067791 A1* | 3/2015 | Matus .................. | G06F 21/32 726/4 |
| 2015/0088656 A1 | 3/2015 | Singh | |
| 2015/0133091 A1 | 5/2015 | Baldwin et al. | |
| 2015/0293926 A1* | 10/2015 | Yang .................. | H04W 4/02 707/610 |
| 2015/0347730 A1* | 12/2015 | Matus .................. | G06F 21/32 726/19 |
| 2015/0351156 A1 | 12/2015 | Xie et al. | |
| 2016/0029214 A1* | 1/2016 | Lu .................. | H04W 12/06 455/415 |
| 2016/0049071 A1* | 2/2016 | Beaver .................. | G08B 29/185 340/514 |
| 2016/0195861 A1* | 7/2016 | Chen .................. | H04L 12/2816 700/275 |
| 2017/0064029 A1 | 3/2017 | Das et al. | |
| 2017/0064037 A1 | 3/2017 | Das et al. | |
| 2017/0064609 A1 | 3/2017 | Park et al. | |
| 2017/0064616 A1 | 3/2017 | Park et al. | |
| 2017/0104839 A1 | 4/2017 | Starsinic et al. | |

FOREIGN PATENT DOCUMENTS

| | | |
|---|---|---|
| EP | 2575044 A1 | 4/2013 |
| EP | 2820869 A1 | 1/2015 |
| WO | WO-0169387 A2 | 9/2001 |
| WO | WO-2011153503 A1 | 12/2011 |
| WO | WO-2014131000 A2 | 8/2014 |
| WO | WO-2015027246 A1 | 2/2015 |

OTHER PUBLICATIONS

Giannoulakis et al., "On the Applications of Efficient NFV Management towards 5G Networking," 1st International Conference on 5G for Ubiquitous Connectivity, Nov. 26-28, 2014, 5 pgs, ISBN: 978-1-6319-0055-6, DOI: 10.4108/ICST.5GU.2014.258133, XP032735044, Institute of Electrical and Electronics Engineers.

Munoz et al., "Joint Allocation of Radio and Computational Resources in Wireless Application Offloading," Future Network & Mobile Summit 2013 Conference Proceedings, Jul. 3, 2013, pp. 1-10, ISBN: 978-1-905824-37-3, XP032506950, IIMC International Information Management Corporation.

Barbarossa et al., "Communicating While Computing: Distributed Mobile Cloud Computing Over 5G Heterogeneous Networks," IEEE Signal Processing Magazine, Nov. 2014, pp. 45-55, vol. 31 (6), ISSN: 1053-5888, DOI: 10.1109/MSP.2014.2334709, XP011561537, IEEE Service Center, Piscataway, NJ.

* cited by examiner

AUGMENTING REALITY USING A SMALL CELL

BACKGROUND

Field of the Disclosure

The present disclosure, for example, relates to wireless communication systems, and more particularly to an edge computing device co-located with a small cell base station.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, space and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple wireless devices. Base stations may communicate with wireless devices on downstream and upstream links. Each base station has a coverage range, which may be referred to as the coverage area of the cell. Some of these base stations may be lower-powered base stations, such as a picocells, femtocells, or microcells. Such small cells cover a smaller geographic area than macro cells and allow access by user equipments (UEs) with service subscriptions with the network provider.

Current wireless wide area networks (WWANs) generally place content and cloud resources on nodes outside of the mobile network operator's WWAN, far from the wireless device of the end user accessing the nodes on the other side of the WWAN. Similarly, users of wireless local area networks (WLAN) generally access content and cloud resources on these nodes far from the WLAN, which makes the nodes likewise far from the wireless device of the end user accessing the WLAN. When an end user connected to a wireless network near the edge of the WWAN or in a WLAN requests content or services, via their wireless device, the content is generally downloaded from these nodes, through the WWAN or WLAN, and delivered to the wireless device via a radio link. Subsequent requests for the same content result in the content again being downloaded from the nodes through the WWAN or WLAN to the wireless device. In addition, video traffic has increased to an ever-larger proportion of data transmitted over WWANs and WLANs. Unpredictable spikes in demand due to viral videos and live television programming, increases in display and content resolution, and the introduction of enhanced user features have all contributed to this increased growth in data usage. Duplication of requested content can waste resources on the backhaul and transport networks. Similarly, during times of high demand where traffic congestion may occur, content delivery may be affected such that the user experience is reduced. For example, costs of providing the requested data may rise, latency or buffering may increase, and/or the quality of delivered data may be reduced, e.g. by transcoding video to a reduced quality level.

Furthermore, wireless devices may have limited battery life and processing power, in particular mobile devices. Applications and processes running on a wireless device, including to decode and encode content for transmission on the WWAN or WLAN, may use significant mobile device resources. Execution of these applications and processes may shorten battery life and degrade device performance.

SUMMARY

Small cells are radio access nodes that operate beneath the level of the macrocell infrastructure in a wireless network. The small cells may include microcells, femtocells, picocells, and Wi-Fi access points, and access points that integrate wireless wide area network (WWAN) and wireless local area network (WLAN) functions. A small cell may include a base station that may be co-located with an edge computing device. The edge computing device may be integrated within a small cell base station or be a physically separate module communicatively coupled to and in close proximity with the small cell base station that provides edge computing resources at the small cell. The edge computing device may communicate with input/output devices that are in hyper proximity to the small cell. Additionally or alternatively, the edge computing device may communicate with a wireless device that is in hyper proximity to the small cell and the input-output sensors. The input/output devices may be capable of sensing aspects of the environment (e.g., via microphones, light sensors, cameras, thermometers, etc.) and providing a stimulus to an individual within hyper proximity to the input-output devices. The stimulus may be in response to or based on the environmental information gathered by the input-output devices. The stimulus may be auditory, visual, aromatic, or tactile in nature.

A method of wireless communication is described. The method may include determining a physical operating context of a mobile device in a small cell based at least in part on a mobile device triggered input to a base station in the small cell, wherein the base station is co-located with an edge computing device, and controlling, by the edge computing device, an output device to provide a stimulus to a user of the mobile device based at least in part on the determined physical operating context.

An apparatus for wireless communication is described. The apparatus may include means for determining a physical operating context of a mobile device in a small cell based at least in part on a mobile device triggered input to a base station in the small cell, wherein the base station is co-located with an edge computing device, and means for controlling, by the edge computing device, an output device to provide a stimulus to a user of the mobile device based at least in part on the determined physical operating context.

A further apparatus for wireless communication is described. The apparatus may include a processor, memory in electronic communication with the processor, and instructions stored in the memory that are executable by the processor to determine a physical operating context of a mobile device in a small cell based at least in part on a mobile device triggered input to a base station in the small cell, wherein the base station is co-located with an edge computing device, and control, by the edge computing device, an output device to provide a stimulus to a user of the mobile device based at least in part on the determined physical operating context.

A non-transitory computer-readable medium storing code for communication at a wireless is described. The code may include instructions executable to determine a physical operating context of a mobile device in a small cell based at least in part on a mobile device triggered input to a base station in the small cell, wherein the base station is co-located with an edge computing device, and control, by the edge computing device, an output device to provide a stimulus to a user of the mobile device based at least in part on the determined physical operating context.

Some examples of the method, apparatuses, or non-transitory computer-readable medium described herein may further include processes, features, means, or instructions for scanning a content of the request for content. In some examples, controlling the output device is further based at least in part on a request for content made by the mobile device in the small cell, the method further. Additionally or alternatively, in some examples controlling the output device comprises controlling a display based at least in part on a proximity of the mobile device to the display.

In some examples of the method, apparatuses, or non-transitory computer-readable medium described herein, determining the physical operating context of the mobile device comprises gathering sensor data from a sensor in the small cell, and analyzing the sensor data to determine the physical operating context of the mobile device. In some examples, the sensor is one or more of a microphone, a temperature sensor, a light sensor, or a camera.

Some examples of the method, apparatuses, or non-transitory computer-readable medium described herein may further include processes, features, means, or instructions for annotating data content based at least in part on the determined physical operating context, and transmitting the annotated data content to the mobile device. In some examples, annotating the data content comprises annotating the data content with advertising.

In some examples of the method, apparatuses, or non-transitory computer-readable medium described herein, the output device comprises a display, one or more lights, an array of lights, a sign, or a printer. In some examples, the wireless communication resources of the base station are housed in a first module and the edge computing device is housed in a second module in communication with and co-located with the first module. In some examples of the method, apparatuses, or non-transitory computer-readable medium described herein, the small cell is one of a picocell, a femtocell, a microcell, or a wireless fidelity (Wi-Fi) access point. In some examples the small cell comprises a wireless wide area network (WWAN) transceiver and a wireless local area network (WLAN) transceiver.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
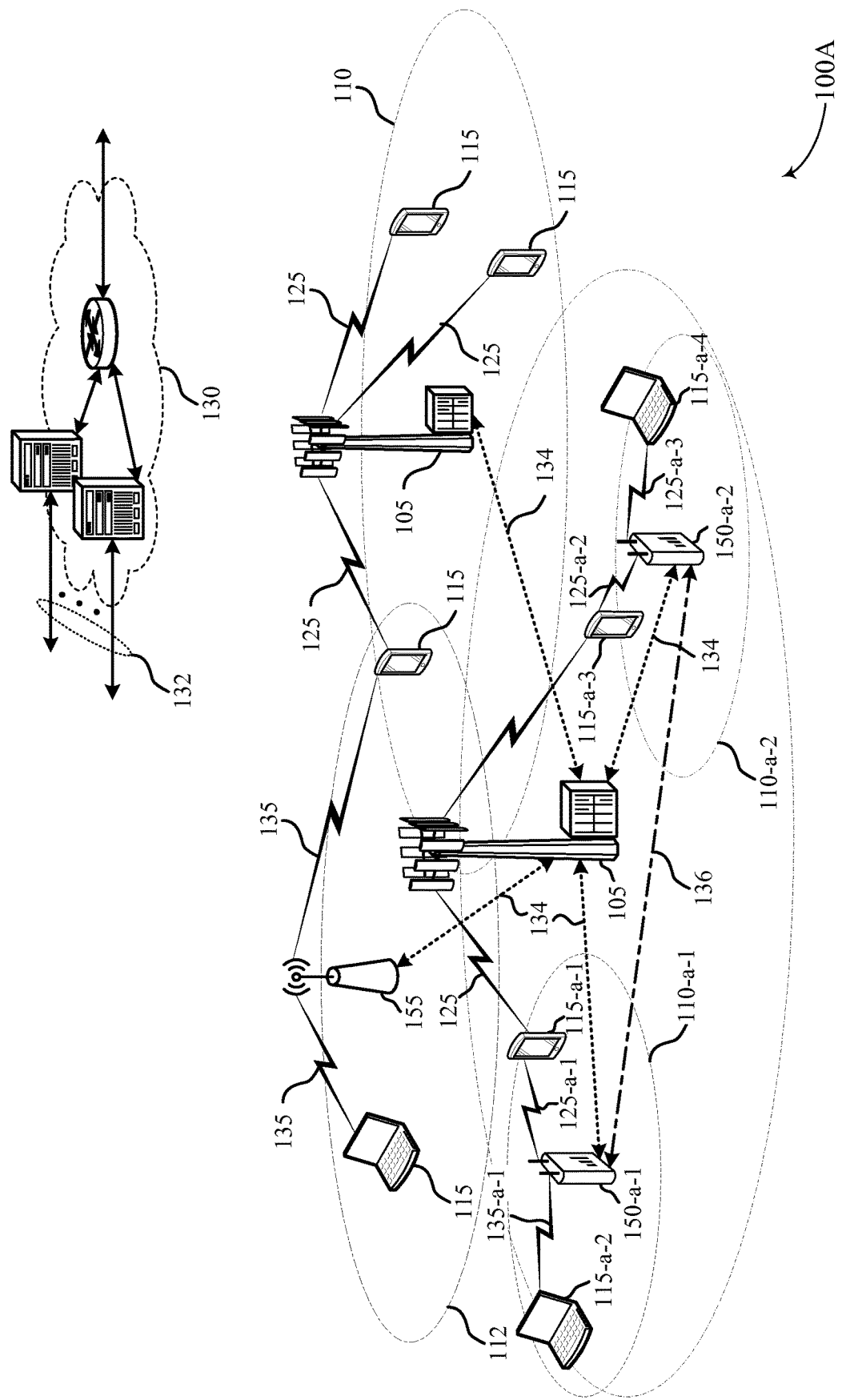
FIG. 1A shows a block diagram of a wireless communications system, in accordance with various aspects of the present disclosure.

In the description that follows, an edge computing device may be co-located with a small cell base station. A small cell base station may include a wireless wide area network (WWAN) radio that operates in licensed and unlicensed spectrum. The WWAN radio may include adaptations that enable operation with other unlicensed band technologies. Small cell base stations, in addition to having WWAN radios, may have wireless local area network (WLAN) radios to connect to a WLAN (e.g. Wi-Fi, Wi-MAX, ZigBee, Bluetooth, etc.). Thus, a small cell base station may also act as a WLAN access point according to the present disclosure. Small cells are radio access nodes that operate beneath the level of the macrocell infrastructure in a wireless network (e.g. microcells, femtocells, picocells, Wi-Fi access points, and access points that integrate WWAN and WLAN functions). Furthermore, small cells have a range that is small compared to macrocells. An edge computing device may be integrated within a small cell base station, or may be a physically separate device that is in communication with the small cell base station. In either case, an edge computing device may be in close proximity to a user's wireless device that is in communication with the edge computing device via the wireless resources of the small cell. The close proximity of small cell base stations to an associated wireless device's position may be harnessed to provide enhanced support and services to the wireless devices and their users.

The described edge computing devices may support the dynamic distribution of processing of data and/or content between the edge computing device and a wireless device wirelessly connected to the edge computing device through a small cell. The edge computing devices may also prefetch content, for example webpages, content, and data, and cache it to the edge computing device based on the specific context of a wireless device determined relative to a small cell. An edge computing device may also host an advertising server or engine, providing enriched local advertising, augmented advertisement or other contents, and enabling the augmentation of a user's experience using an output display device in the proximity of the wireless device user. Examples of such augmentation may include providing augmented reality images on top of local mapping data on a mobile device, adding sound, light, and/or other effects on another device, for example on a television, display or other output device in an electronics store. In another example different colored blinking lights on a television or other display may be used to indicate the locations of different people as they move about the electronics store. The augmentation may be of actual reality, for example, by providing sounds, smells, visual stimuli, such as by means of lights, or physical objects, such as bubbles or confetti, to the user of a mobile or wireless device.

The edge computing devices discussed herein may also operate as enriched local advertising server to augment advertising at the edge computing device or augment a user's experience at an output near the edge computing device. As used herein, advertising may refer to a commercial advertisement, for example to encourage a user to purchase a product or service, but may also refer to the display, communication, or other dissemination of information to a user. For example, a museum may user advertising to tell members of an audience where the displays are in a museum. In another example, a business, my advertising the location of a business meeting to tell a user where to go. In some cases, the edge computing device may facilitate the augmentation of actual reality by controlling input/output devices to provide stimuli to individuals in close proximity. These computing resources, as well as additional computing resources that may be surplus or provided specifically for this purpose, may also be provided to host applications, including third party applications, at the edge computing device, and offer services for the small cell users. In some examples, a small cell platform is used to host applications/services for a group of neighboring small cells that may not have the spare compute and other resources (e.g., the small cells may have different capabilities). Surplus computing resources may be extra computing resources for use during a worst-case processor load. The difference between the total computing resources and the computing resources being used under a current processor load is the surplus computing resources. In some examples, the surplus computing resources are additional cores of a multi-core design that may be powered down when computing needs are less. In another example, the surplus computing resources may be a core that is designed for a maximum frequency but is currently operating at a lower frequency.

The described edge computing devices are located away from nodes but are instead in close proximity to wirelessly-connected wireless devices i.e., end users. The disclosed edge computing devices enable local analytics and knowledge generation to occur at the source of the data, near an end user, and leverages resources that may not be continuously connected to a network such as laptops, smartphones, tablets and sensors. The herein described edge computing devices may improve response times for requests from wireless devices connected to the WWAN or WLAN, as well as increase the amount of data that can be used in environments where there is a limited data connection. Prefetching, caching, processing, and/or serving data at the edge computing devices, co-located with small cell base stations, may also reduce overall demand on the backhaul network or internet, and help limit signaling and user traffic to and/or from core networks.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1A illustrates an example of a wireless communications system 100A in accordance with various aspects of the disclosure. The wireless communications system 100A includes base stations 105, wireless devices 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., Si, etc.) and may perform radio configuration and scheduling for communication with the wireless devices 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the wireless devices 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB (HNB), a Home eNodeB (HeNB), access point, or some other suitable terminology. The geographic coverage area 110 for a base station 105 may be divided into sectors making up only a portion of the coverage area (not shown). The wireless communications system 100A may include base stations 105 of different types (e.g., macro and/or small cell base stations). There may be overlapping geographic coverage areas 110 for different technologies.

In some examples, the wireless communications system 100A is a Long Term Evolution (LTE) or LTE-Advanced (LTE-A) network. In LTE/LTE-A networks, the term evolved Node B (eNB) may be generally used to describe the base stations 105, while the term user equipment (UE)

may be generally used to describe the wireless devices 115. The wireless communications system 100A may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a term used by an organization named "3rd Generation Partnership Project" (3GPP) to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A base station for a macro cell may be referred to as a macro eNB or base station. A small cell may be associated with a lower-powered base station, as compared with a macro cell, that may operate in the same or different (e.g., licensed, unlicensed, etc.) frequency bands as a macro cell base station. A base station for a small cell may be referred to as a small cell, a small cell eNB, a small cell base station, a pico eNB or base station, a femto eNB or base station, or a home eNB or base station. A small cell may refer to the communications and devices associated with a small cell base station. For example, small cell base station 150-a-1 may be associated with geographic coverage area 110-a-1, wireless device 115-a-1, communication link 125-a-1, wireless device 115-a-2, and communication link 135-a-1. Similarly, small cell base station 150-a-2 may be associated with geographic coverage area 110-a-2, wireless device 115-a-3, communication link 125-a-2, wireless device 115-a-4, and communication link 125-a-3. A small cell may include picocells, femtocells, and microcells according to various examples. A picocell may cover a relatively smaller geographic coverage area 110 and may allow unrestricted access by UEs with service subscriptions with the network provider. A femtocell also may cover a relatively small geographic area (e.g., a home) and may provide restricted access by UEs having an association with the femtocell (e.g., UEs in a closed subscriber group (CSG), UEs for users in the home, open and multi-operator, and the like). Because a femtocell covers a relatively small geographic footprint, the computing needs of a femtocell may vary significantly from femtocell to femtocell. For example, a femtocell that covers an aisle in a grocery store may have different responsibilities than a femto cell in a library aisle. Thus, femtocells may experience a larger variance in computing needs than macrocells.

A small cell base station 150 may include WLAN radios, and may additionally function as a Wi-Fi access point (AP) for wireless devices 115. Wireless devices 115 may communicate with a small cell base station 150 having Wi-Fi functionality using communication links 135. The small cell base stations 150 may also communicate directly with each other using communication links 136, which may be wired or wireless, and may also communicate with each other using backhaul links 134. The wireless devices 115 may be Wi-Fi only devices or operate in a Wi-Fi only mode.

The wireless communications system 100A may support synchronous or asynchronous operation. For synchronous operation, the base stations 105 and small cell base stations 150 may have similar frame timing, and transmissions from different base stations 105 or small cell base stations 150 may be approximately aligned in time. For asynchronous operation, the base stations 105 and small cell base stations 150 may have different frame timing, and transmissions from different base stations 105 or small cell base stations 150 may not be aligned in time. The techniques described herein may be used for either synchronous or asynchronous operations.

The wireless devices 115 are dispersed throughout the wireless communications system 100A, and each wireless device 115 may be stationary or mobile. A wireless device 115 may also include or be referred to by those skilled in the art as a mobile station, a subscriber station, a mobile unit, a subscriber unit, a wireless unit, a remote unit, a mobile device, a wireless communications device, a remote device, a mobile subscriber station, an access terminal, a mobile terminal, a wireless terminal, a remote terminal, a handset, a user agent, a UE, a mobile client, a client, or some other suitable terminology. A wireless device 115 may be a cellular phone, a personal digital assistant (PDA), a wireless modem, a wireless communication device, a handheld device, a tablet computer, a laptop computer, a cordless phone, a wireless local loop (WLL) station, or the like. A wireless device 115 may be able to communicate with various types of base stations 105, small cell base stations 150, and network equipment including macro eNBs, small cell eNBs, relay base stations, and the like.

The communication links 125 shown in wireless communications system 100A may include uplink (UL) transmissions from a wireless device 115 to a base station 105, and/or downlink (DL) transmissions, from a base station 105 to a wireless device 115. The downlink transmissions may also be called forward link transmissions while the uplink transmissions may also be called reverse link transmissions. Each of the communication links 125 may include one or more carriers which may be able to carry one or more waveform signals of different frequencies. The waveform signals may be modulated according to the various radio technologies described above. Each modulated signal may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

In some embodiments of the wireless communications system 100A, base stations 105, small cell base stations 150, and/or wireless devices 115 may include multiple antennas for employing antenna diversity schemes to improve communication quality and reliability between base stations 105 and wireless devices 115. Additionally or alternatively, base stations 105, small cell base stations 150, and/or wireless devices 115 may employ multiple-input, multiple-output (MIMO) techniques that may take advantage of multi-path environments to transmit multiple spatial layers carrying the same or different coded data.

Wireless communications system 100A may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A wireless device 115 may be configured with multiple downlink CCs and one or more uplink CCs for carrier aggregation. Carrier aggregation may be used with both FDD and TDD component carriers.

In some embodiments, the wireless communications system 100A may include an AP 155. Wireless devices 115 may communicate with an AP 155 using communication links 135, and each wireless device 115 may also communicate directly with one or more other wireless devices 115 via a direct wireless link. Two or more wireless devices 115 may communicate via a direct wireless link when both wireless devices 115 are in the AP geographic coverage area 112 or when one or neither wireless device 115 is within the AP geographic coverage area (not shown). Examples of direct wireless links may include Wi-Fi Direct connections, connections established by using a Wi-Fi Tunneled Direct Link Setup (TDLS) link, and other peer-to-peer (P2P) group connections. The wireless devices 115 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within wireless communications system 100A.

In addition to resources for communicating in wireless communications system 100A as a small cell base station, one or more of small cell base station 150-$a$-1 and small cell base station 150-$a$-2 may include or be associated with an edge computing device having a number of edge computing resources to support certain operations for wireless devices 115 wirelessly connected to a small cell. Thus, the edge computing resources of one or more of small cell base station 150-$a$-1 and small cell base station 150-$a$-2 may support the dynamic distribution of processing of data and/or content between the small cell base station 150 and a wireless device 115 wirelessly connected to the small cell base station 150. The edge computing devices may also prefetch content and cache it to the edge computing device based on the specific context of a wireless device 115. An edge computing device may also host an advertising server or engine, providing enriched local advertising and physical augmentation of advertising. The edge computing device may also operate as enriched local advertising servers. Computing resources of the edge computing device may also be provided to host applications, including third party applications, on the edge computing device one or more of small cell base station 150-$a$-1 and small cell base station 150-$a$-2.

In some cases, the edge computing device may be used to augment actual reality. That is, the edge computing device may enhance, influence, or alter actual aspects of reality (e.g., aspects perceivable by the unaided senses of an individual). For example, although not shown, other wireless devices may communicate with a small cell base station 150 or an edge computing device. For example, input or output devices such as sensors, temperature sensors (e.g., thermometers), microphones, speakers, lights (e.g., light emitting diodes (LEDs)), displays, aromatic dispensers, and the like may be in communication, directly or indirectly, with the edge computing device or small cell base station 150. The input devices may sense or detect aspects of the environment (e.g., light conditions, verbal phrases, temperature, etc.) and report the information to the edge computing device. The output devices may receive instructions or commands from the edge computing device and provide a stimulus (e.g., activate a light display or transmit a sound wave) to an individual within hyper proximity to the small cell base station 150-$b$. An edge computing device may serve a discrete, localized geographical area within a small cell. For example, an edge computing device may monitor and direct input/output (I/O) devices that are distributed along a single aisle of a library, or within a single exhibit at a museum. In some cases, the edge computing device may leverage information from a sensor or wireless device 115 (e.g., received at a small cell base station 150, or at the edge computing device) to activate an output device near the user of the wireless device 115. For example, a message from a wireless device 115 may indicate to an edge computing device in the cereal aisle of a grocery store that the user of the wireless device 115 is looking up a certain type of cereal (e.g., cereals that do not contain a particular ingredient). The edge computing device may analyze the received information and activate smart tags (e.g., LEDs) distributed among the available cereal types to indicate the cereals that are free of the particular ingredient. In some cases, if there are multiple individuals with wireless devices 115 in the same location (e.g., the cereal aisle) the edge computing device may assign each individual an identifier (e.g., a color of LED) that distinguishes the smart tags between the individuals.

Figure 1B:
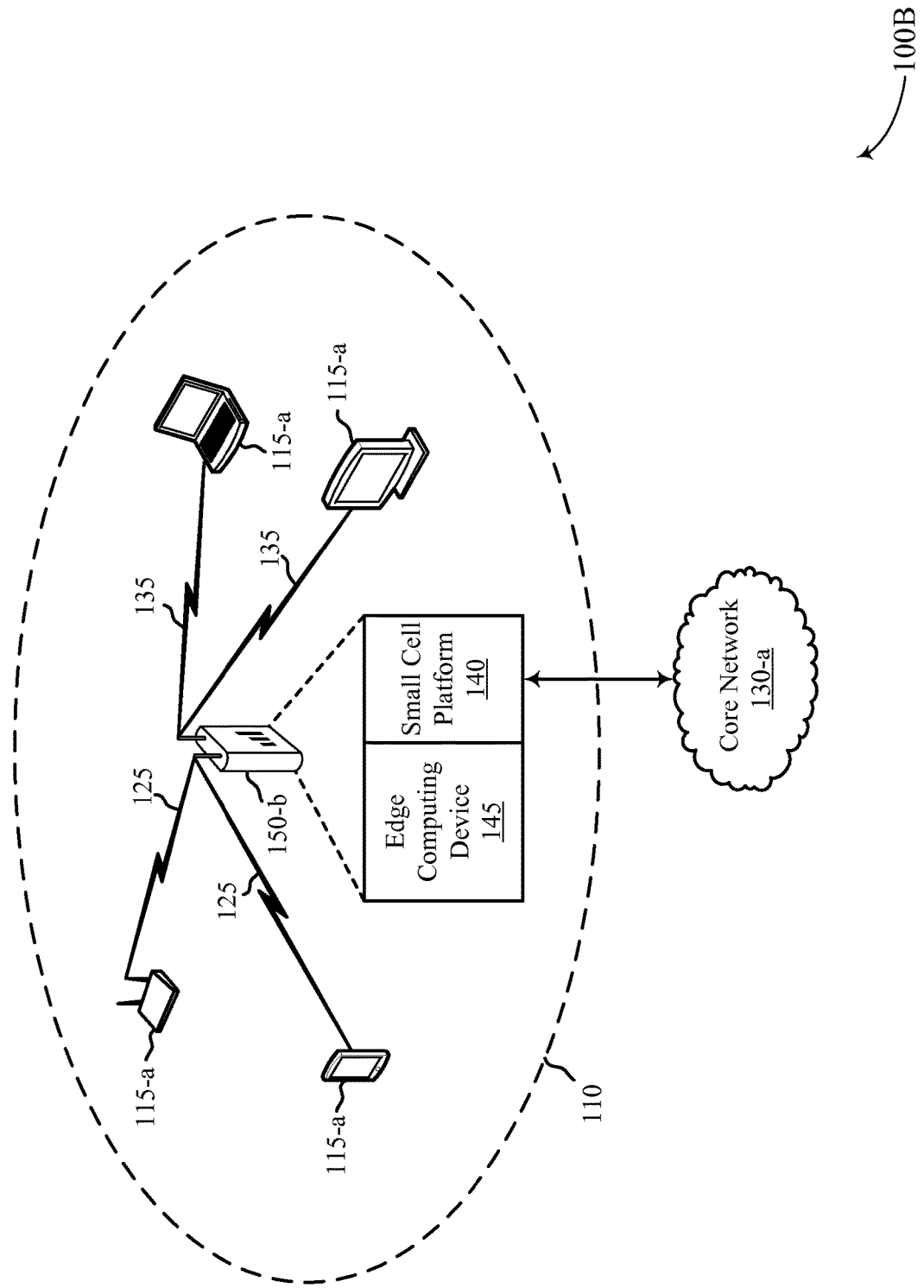
FIG. 1B shows a block diagram of a wireless communications system, in accordance with various aspects of the present disclosure.

Referring to FIG. 1B, a block diagram illustrates an example of a wireless communications network 100B. The wireless communications network 100B may include portions of wireless communications system 100A (e.g., the wireless communications network 100B may be a portion of a small cell). The wireless communications network 100B may include a small cell base station 150-$b$ and one or more wireless devices 115-$a$, such as mobile stations, personal digital assistants (PDAs), other handheld devices, netbooks, notebook computers, tablet computers, laptops, display devices (e.g., TVs, computer monitors, etc.), printers, etc. Each of the wireless devices 115-$a$ may associate and communicate with small cell base station 150-$b$ via one or more of communication links 125 and communication links 135. Each small cell base station 150-$b$ has a geographic coverage area 110 such that wireless devices 115-$a$ within that area can typically communicate with the small cell base station 150-$b$. The wireless devices 115-$a$ may be dispersed throughout the geographic coverage area 110. Each wireless device 115-$a$ may be stationary or mobile. Although not shown in FIG. 1B, a wireless device 115-$a$ can be covered by more than one small cell base station 150 and/or macro cell (not shown).

Small cell base station 150-$b$ includes a small cell platform 140 and an edge computing device 145. The edge computing device 145 may be integrated within a small cell base station 150-$b$ (e.g., with the small cell platform 140), or be a physically separate module communicatively coupled to and in close proximity with the small cell platform 140. Thus, the small cell base station 150-$b$ may be a single integrated component, or may comprise a greater number of separate components that are communicatively coupled together. In some cases, the small cell platform 140 encapsulates the edge computing device 145. In such instances, the extra processing power on the small cell platform 140 is the edge computing device 145. Small cell base station 150-$b$, and specifically small cell platform 140, may communicate with core network 130-$a$, as well as provide connectivity with core network 130-$a$ for the edge computing device 145 and wireless devices 115-$a$. Small cell base station 150-$b$, and specifically small cell platform 140, may also provide connectivity for edge computing device 145 with wireless devices 115-$a$.

Edge computing device 145 provides a number of edge computing resources and functions at the small cell base station 150-$b$ that will be further set out below and in greater detail throughout this disclosure.

The edge computing device 145 may provide processing resources to support one or more wireless devices 115-$a$. Processing of data may be dynamically allocated between a wireless device 115-$a$ and an edge computing device 145 co-located with the small cell base station 150-*b*. Processing responsibilities for data downloaded and to be delivered to the wireless device 115-*a* can be allocated to the wireless device 115-*a*, to the edge computing device 145, or split between the wireless device 115-*a* and the edge computing device 145. The allocation of processing responsibilities can be dynamic, for example based on a state of the wireless device 115-*a*, the quality of the radio link between the small cell base station 150-*b* and the wireless device 115-*a*, and/or the type of data to be delivered to the wireless device 115-*a*. The edge computing device 145 may be allocated responsibility to decompress (decode) data that is compressed (encoded) based at least in part on the type of compressed data (e.g. specifically for a particular type of compressed video, audio, or image data). Processing of compressed data by the edge computing device 145 may involve decompressing the compressed data, or processing compressed data into a less-compressed state (i.e. decompressing data compressed at a high level into an uncompressed state and then compressing the data using a compression algorithm or encoder using a lower compression level). The edge computing device 145 may also download multiple versions of the same compressed data, where one of the versions is sent to the wireless device 115-*a* based at least in part on a condition of the radio link or state of the wireless device 115-*a*.

Processing responsibilities may also be allocated to the edge computing device 145 according to a state of the wireless device 115-*a*, for example, power consumption at the wireless device 115-*a*, or processing capability, processing availability, or headroom, battery state, coexistence problems due to concurrent utilization of different radios, or thermal state of the wireless device 115-*a*. Processing may be further allocated to the edge computing device 145 when the processing availability of the wireless device 115-*a* is below a threshold, when the battery life is below a threshold, where a temperature of the wireless device 115-*a* is above a threshold, or where the expected power consumption of the processing at the wireless device 115-*a* would exceed a predetermined power consumption threshold. The edge computing device 145 may also process, or not process, received data according to a processing capability report received from the wireless device 115-*a*. In addition, the edge computing device 145 may be allocated processing responsibility based on, for example, the observed quality of the radio link between the wireless device 115-*a* and the edge computing device 145/small cell base station, radio conditions, throughput, measurements, or expected future radio conditions (e.g., where the wireless device 115-*a* is travelling to, hand-off scenarios, loading, etc.).

Content may also be prefetched or otherwise retrieved by the edge computing device 145 and cached locally in anticipation of requests for such content from a wireless device 115-*a*. Prefetching of the content may be determined at least in part on information that is local to the edge computing device 145. Such local information may include the physical location of the edge computing device 145, the physical location of the wireless device 115-*a*, or input about the physical location based on data gathered from a sensor or other input device of the edge computing device 145 (e.g. from a microphone, temperature sensor, light sensor, or camera). Local information may also include previously assembled profiles for users of wireless device 115-*a*, including users' past requests for particular data. Local information may also relate to requests made by a user for related content. For example, for a video, prefetched content can include the same video previously requested by users of other wireless devices 115-*a*, the next segment in a series of videos where a segment has been previously requested by a wireless device 115-*a* connected to the edge computing device 145, or videos related to a video previously fetched in response to a previous request from a wireless device 115-*a*.

Prefetching and locally caching at an edge computing device 145 may use additional storage capacity at the edge computing device 145, but it may be beneficial to allow content to be prefetched during periods of low usage of a backhaul network, saving bandwidth and decreasing latency. Prefetching may also potentially eliminate the need to repeatedly transport the same popular content from the source of the content to the requesting wireless device 115-*a*. Prefetching as described above may be especially beneficial where the content does not change substantially over time (e.g. a certain music video or audio file), and there is a higher likelihood that users of the wireless device 115-*a* will request such content via the edge computing device 145 prior to the content becoming stale. The prefetched content for a particular wireless device 115-*a* may also be transferred from a first edge computing platform to a second edge computing platform based on the expected physical location of the wireless device 115-*a*. Prefetching may also be performed when more power is available (e.g., the sun is out for small cells powered by solar panels) or when power levels are high (e.g., battery backup capacity is topping out). Further, pre-fetching can be performed being context aware. For example, augmented content can be pre-fetched in a small cell as opposed to augmentation being done on the small cell.

The edge computing device 145 discussed herein may also operate as an enriched local advertising servers. Advertising at the edge computing device 145 or at an output near the edge computing device 145 may be physically augmented by the edge computing device 145. The edge computing device 145 may also serve advertisement data to the small cell and/or output near the small cell. An advertising server may run on the edge computing device 145, where the advertising server is configured to dynamically insert advertising content and data into content requested by the wireless device 115-*a* via the small cell. Specific advertising data and content may also be prefetched and cached at the edge computing device 145 based on the physical location of the edge computing device 145, and/or the location of the wireless device 115-*a* relative to the edge computing device 145. For example, an advertising server running on the edge computing device 145 may serve up content specifically targeted to users of wireless device 115-*a* operating in a sports stadium or grocery store aisle.

In some examples, prefetching and caching may be reactive. That is, prefetching and caching may be performed when the same or similar content is requested by at least one user. Content may be pre-fetched and cached when the small cell determines that the content is likely to be viewed by other users in the proximity. This determination may be based in part on, for example, user profiles for the users. Content may also likely be pre-fetched or consumed due to actions of other nearby users, who may not necessarily consuming the same content. Content may be pre-fetched and cached based on requested content on nearby or similar cells, which may be further based on demographics of the users.

The different edge nodes may have the same or differing storage and processing capabilities. In some examples, several small cells may form a cluster of small cells with a small cell acting as a cluster-head. The cluster-head small cell may be used for local storage, local service hosting, processing, and the like. In some examples, edge nodes have distributed processing and storage capabilities. Distributed caching may be performed amongst edge nodes (e.g., small cells). For example, some nodes may cache some content and other nodes cache other content (caching across sites can be a function of storage, backhaul, use, etc.). Caching can also be performed across multiple wireless devices, such as data being hashed across multiple devices.

Specific advertising data and content may also be prefetched and cached based at least in part on activity performed by a wireless device 115-*a* or other information collected by small cell base station 150-*b* about wireless device 115-*a*, including wireless device 115-*a* previously connected to the small cell base station 150-*b*, or connected to other small cell base stations. This activity or information about wireless device 115-*a* may include contents of past search requests, meta data concerning wireless device 115-*a*, web site visitation or application usage history, or information from one or more sensors of wireless device 115-*a*, for example gyroscope, accelerometer, temperature, or GPS sensors, information. The advertising data and content may also be prefetched and cached based at least in part on analytics for activity performed by other wireless devices, including wireless devices previously connected to small cell base station 150-*b* or other small cell base stations such as neighboring base stations. Such activity and information may be the same as for wireless device 115-*a*, but collected and analyzed for the other wireless devices.

In addition, the advertising server can communicate with other local input/output devices to provide physical stimuli to the user of the wireless device 115-*a* in addition to the wireless device 115-*a* itself. For example, the advertising server may direct the edge computing device 145 to activate lights, displays, speakers, devices to distribute scents, or other output devices that are physically located in proximity to the edge device and/or wireless device 115-*a* in connection with a request for content from the wireless device 115-*a*.

The edge computing device 145 may also perform local analytics for a wireless device 115-*a* based on contextual data for the wireless device 115-*a*, for example the physical location or trajectory of the wireless device 115-*a*, or the location, surroundings, etc. of other wireless devices 115-*a* connected to the small cell base station where the edge computing device 145 is located. Such performance of local analytics by an edge computing device 145 may enhance user experience (e.g., when the user is in a small cell area with a dense deployment). For example, a user in a congested network may experience delays due to an excess of wireless traffic. Additionally, a central entity responsible for performing analytics may not have the local contextual information needed to supply location-specific services. Thus, offloading certain analytics to an edge computing device 145 (or a small cell base station 150) may decrease service delays and enable service relevant to the specific location of the user. For example, running an ad server on a small cell base station 150 or edge computing device 145 may reduce latency and provide richer content (e.g., contextually or situationally relevant content). In some cases, processing may be moved to and from the edge computing device 145 and wireless device 115-*a* based on availability of processing power and needs. The processed analytics data concerning location, user searches, may inform Google® Ad Words®, bidding for advertisement, etc.

Running an advertising server on the edge computing device 145 may allow the advertiser to serve richer advertising content by reducing the backhaul bandwidth required to serve the advertisements and reduce latency to deliver the advertisements to the user of the wireless device 115-*a*. As a result, it may be less expensive for a network operator to provide the advertising, because of the reduced use of network bandwidth, for example the backhaul network of a WWAN or an internet service provider (ISP) connected to a WLAN. In such a case the WWAN network operator or ISP may provide a discounted data rate to the user of the wireless device 115-*a* for advertising data served to the wireless device 115-*a* from the network computing device.

As a result of the proximity of edge computing device 145 to the WWAN small cell or WLAN access point, the edge computing device 145 may also control proximate I/O devices, also connected to the edge computing device 145, to interact with and provide stimuli to the user of the wireless device 115-*a* according to a location of the user of the wireless device 115-*a*, sensor input from the wireless device 115-*a* or edge computing device 145, and/or the content of requests made by the wireless device 115-*a* user via the edge computing device 145.

The edge computing device 145 may also take in data concerning the location and environment of a wireless device 115-*a*, and by extension the user of the wireless device 115-*a*, to control input/output devices to stimulate a wireless device 115-*a* user. Sensor data for the wireless device 115-*a* and/or edge computing device 145 may be collected (e.g. from an input device such as a microphone, temperature, or light sensor, or camera). Because of the close proximity of the wireless device 115-*a* and the edge network device to which the wireless device 115-*a* is connected as well as the known location of the edge computing device 145, the edge computing device 145 may use this information to control, according to data at the edge computing device 145, a device (e.g., an output device) external to the wireless device 115-*a* itself that is within the known proximity of the user of the wireless device 115-*a*. The external device may deliver or serve advertising content or data. For example, an external device may be controlled by the edge computing device 145 to annotate data content provided to the edge computing device 145 by the wireless device 115-*a* according to information specific to the physical environment of the edge computing device 145. Annotating may include annotating the data content with images or text. As another example, the edge computing device 145 may control an I/O device (external to the edge computing device 145) to provide a stimulus to the user of the wireless device 115-*a* based on at least one characteristic of the wireless device 115-*a* user determined from the edge computing device 145 (e.g., a physical location of the wireless device 115-*a* by virtue of proximity to the small cell base station to which the wireless device 115-*a* is connected, or the content of a request made by the user of the wireless device 115-*a*).

The edge computing device 145 may also have surplus computing resources that may host third party applications. These computing resources may also be provided for such purpose. Mobile applications typically run on a wireless device 115-*a* or on a network component, such as a content delivery network, or other server. At the same time, wireless device 115-*a* generally have limited computing power and battery life, while an edge computing device 145 will likely have a dedicated power connection. Thus, edge computing device 145 may be configured to allow use by third-party applications in close proximity to the end user (i.e., the wireless device 115-*a*), but with fewer power and processing constraints than the wireless device 115-*a*.

In an example, an application running on a user's mobile device may be enhanced by a complementary application running on the edge computing device 145. The complementary application may provide processing that enhances the user experience, for example by monitoring incoming messages to the wireless device 115-*a* and sending alerts according to predefined parameters. The resources of the edge computing device 145 may also be provided as a service to a third party, for example by providing a virtual machine running on the edge computing device 145 to run the third party application. This way, the third party can provide an enhanced experience to the user of a wireless device 115-*a* by running the third party's own application in close proximity to the wireless device 115-*a*, but where the application is under the direction and control of the third party. The third party can cache selected data or content to the edge computing device 145, and provide an application to the wireless device 115-*a* that interacts with the cached data or content. The application of the wireless device 115-*a* may also be provided to interact with the application running on the edge computing device 145 or server. Thus, the wireless device 115-*a* application may interact with distant servers through the WWAN and/or internet less frequently, enhancing the experience of the wireless device 115-*a* user. In addition, computation performed by the third-party application for the wireless device 115-*a* may be moved or transferred from the edge computing device 145 to a second edge computing device to follow a wireless device 115-*a* of the user from the edge computing device 145 to the second edge computing device.

Figure 2:
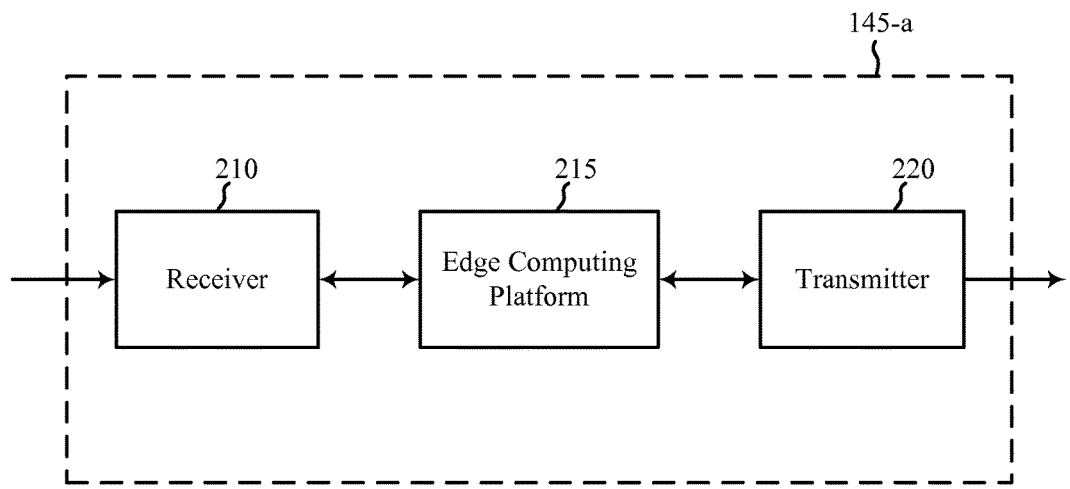
FIG. 2 shows a block diagram of a device configured for use in wireless communications system that supports an edge computing platform, in accordance with various aspects of the present disclosure.

FIG. 2 shows a block diagram 200 of an edge computing device 145-*a* configured for use in wireless communication system that supports an edge computing device for a small cell, in accordance with various aspects of the present disclosure. The edge computing device 145-*a* may be an example of one or more aspects of an edge computing device 145 described with reference to FIG. 1B. The edge computing device 145-*a* may include a receiver 210, an edge computing platform 215, and/or a transmitter 220. The edge computing device 145-*a* may also be or include a processor (not shown). Each of these modules may be in communication with each other. In some cases, the edge computing device 145-*a* may be integrated with a small cell base station 150. In such cases, the edge computing device 145-*a* may provide additional computing power for the small cell base station 150 and thus may not include the receiver 210 or the transmitter 220. For example, although the edge computing device 145-*a* is shown encapsulating the edge computing platform 245, in some cases, the edge computing platform 245 encapsulates the edge computing device 145-*a*. That is, the edge computing device 245 may surround or include the edge computing device 145-*a*, the received 210, and/or the transmitter 220. Thus, the edge computing platform 245 may leverage the functionality of the edge computing device 145-*a* to boost processing power.

The edge computing device 145-*a*, through the receiver 210, the edge computing platform 215, and/or the transmitter 220, may be configured to perform functions described herein. For example, the edge computing device 145-*a* may be configured to provide edge computing resources for a wireless device that is in communication with a small cell. For example, the edge computing platform 215 may receive location and use-dependent information (e.g., physical operating context information) from an external device (e.g., an I/O device or wireless device 115) and control the behavior of a different (or same) external device to provide a stimulus (or stimuli) to an individual in hyper proximity to the edge computing device 145-*a*. The processing responsibilities of the edge computing platform 215 may, in some cases, be dynamically off-loaded or distributed among other devices (e.g., edge computing devices 145, small cell base stations 150, or wireless devices 115) associated with the same or different small cell. In other cases, certain processing functions may be outsourced to the core network. In some instances (e.g., when the backhaul has certain costs or limitations), the edge computing device 145-*a* may compress information.

The components of the edge computing device 145-*a* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented, in whole or in part, with instructions embodied in a memory, formatted to be executed by one or more general or application-specific processors.

The receiver 210 may receive information such as packets, user data, and/or control information associated with various information channels (e.g., control channels, data channels, etc.). The receiver 210 may be configured to receive content, data, and other information requested from a network by a wireless device, which may include audio, video, advertising, webpage, or other data from a network at the request of a wireless device in communication with a small cell such as with the edge computing device 145-*a*, requests for such content or data sent from a wireless device, as well as requests to use edge computing resources by wireless devices, and inputs from various sensor or input/output devices. Information may be passed on to the edge computing platform 215, and to other components of the edge computing device 145-*a*.

The transmitter 220 may transmit one or more signals received from other components of the edge computing device 145-*a*. The transmitter 220 may transmit audio, video, advertising, webpage, or other data to a wireless device in communication with the small cell such as with the edge computing device 145-*a*, responses to requests to use edge computing resources by wireless devices, and outputs to displays, lights, or other input/output devices. In some examples, the transmitter 220 may be co-located or integrated with the receiver 210 in a transceiver module.

Figure 3:
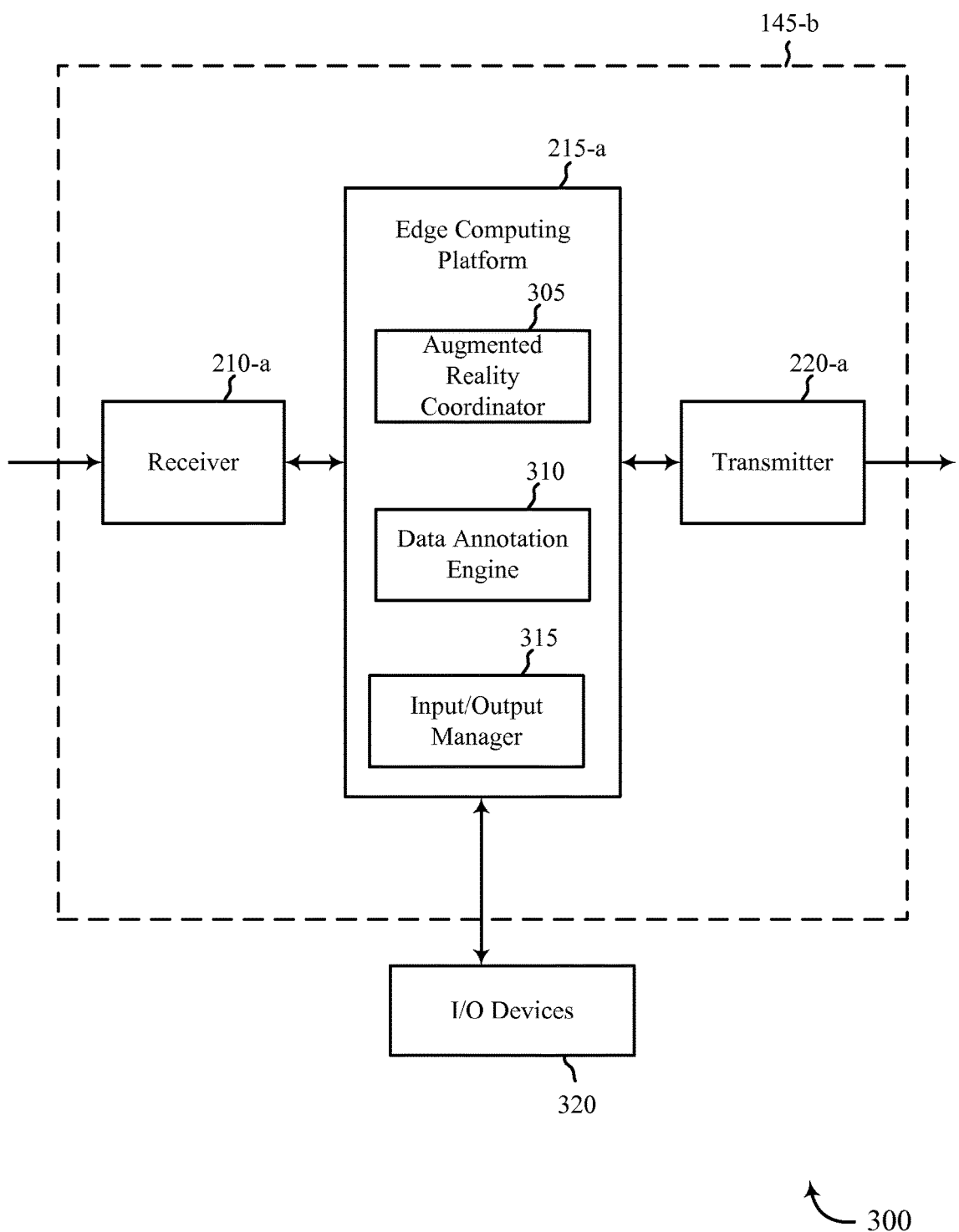
FIG. 3 shows a block diagram of another device configured for use in wireless communications system to support an edge computing platform, in accordance with various aspects of the present disclosure.

FIG. 3 shows a block diagram 300 of another edge computing device 145-*b* configured for use in a wireless communications system for physically augmenting reality at or near the edge computing device 145-*b*, in accordance with various aspects of the present disclosure. Edge computing device 145-*b* may be an example of aspects of an edge computing device 145 or device 145-*a* described with reference to FIGS. 1-2. The edge computing device 145-*b* may be configured to augment reality by noticeably changing aspects of an individual's environment or surroundings (e.g., by triggering an action of an I/O device 320, such as a speaker). The I/O device 320 may be separate from (or co-located with) the small cell base station 150 or edge computing device 145-*b*. For instance, in some cases the I/O device 320 may be part of the small cell base station 150 (e.g., the small cell base station 150 may be equipped with a speaker or a microphone). In some cases, the I/O device 320 may be a wireless communications device such as a UE 115. In some cases, an I/O device 320 may be referred to as an input device or an output device.

The edge computing device 145-b may include a receiver 210-a, an edge computing platform 215-a, and a transmitter 220-a, each of which may perform the respective functions described with reference to FIG. 2. The edge computing platform 215-a may include an input/output manager 315, a data annotation engine 310, and an augmented reality coordinator 305. The edge computing device 145-b may serve or communicate with devices within close proximity to the edge computing device 145-b; that is, the edge computing device 145-b may have a service footprint that is small with respect to a macrocell. For example, the edge computing device 145-b may support devices that are located in a grocery store aisle, a library section, an event center row, an exhibit at a museum, etc. In some instances, the device 145-b may cache information that is specific to the location, environment, or surroundings in which it is positioned. The edge computing device 145-b may also dynamically distribute processing responsibilities to neighbor devices (e.g., small cell base stations 150, wireless devices 115, edge computing device 145, etc.).

The augmented reality coordinator 305 may facilitate behavior manipulation of input/output devices that are located in hyper proximity (i.e., very close) to the edge computing device 145-b. The augmented reality coordinator 305 may receive information (e.g., physical context or operating state information) from an external entity (e.g., a wireless device 115, an input/output device, or a different device 145) via receiver 210-a. The received information may be associated with the specific location, or service footprint, of the edge computing device 145-b. For example, the augmented reality coordinator 305 may receive sensor data in a report from a proximate I/O device 320. The sensor data may be any observable phenomenon perceived by the I/O device 320, including trajectory of an individual, the location of other individuals, physical surroundings, visual events, and audible events.

In some cases, the augmented reality coordinator 305 may receive and utilize context, operational state, or environmental information from a nearby wireless device 115, or another device 145. Additionally or alternatively, the augmented reality coordinator 305 may use information from a number of I/O devices 320 within close proximity; that is, the augmented reality coordinator 305 may combine information from more than one external source. Based at least in part on the received information, the augmented reality coordinator 305 may instigate an action that is performed by an external device (e.g., an I/O device 320 or a wireless device 115) in hyper proximity to the edge computing device 145-b. The action may serve to stimulate an individual within the footprint of the small cell (e.g., the user of a wireless device 115). In some cases, the reporting device and the performing device are the same device; alternatively, the reporting device and the performing device may be two different devices. The augmented reality coordinator 305 may collaborate with the input/output manager 315 to direct the actions of an I/O device 320 or a wireless device 115.

For example, the input/output manager 315 may analyze information passed from the augmented reality coordinator 305 and select a desired behavior for an I/O device 320. For instance, the input/output manager 315 may determine the type of advertisement that should be displayed on a display screen. In one example, a sensor (e.g., a camera) may detect (and relay to the augmented reality coordinator 305) that a nearby individual is wearing a shirt promoting a particular sports team. Based on this information, the augmented reality coordinator 305 may, in conjunction with the input/output manager 315, select an advertisement that is related to sports. In another example, the input/output manager 315 may use location information to promote certain advertisements. For instance, the input/output manager 315 may detect that edge computing device 145-b is at a multi-purpose sporting venue and instigate sporting advertisements based on that knowledge. At a higher level of sophistication, the input-output manager 315 may determine the particular sport that is currently being observed and tailor the advertisements accordingly. Although described with reference to a display screen, a display may be any device that provides a visual stimulus to an individual. For example, a display may be a blinking light or an array of lights.

In some cases, the edge computing platform 215-a may use information (e.g., from I/O devices 320 or a wireless device 115) to dynamically modify the Google® AdWords® associated with a vendor. For example, the edge computing platform may update the vendor's Google® Ad Words® for a certain product based on the physical operating context of a wireless device 115. In another aspect, the edge computing platform 215-a may adjust ad bidding (e.g., real time bidding (RTB)) based at least in part on the physical operating context of a wireless device 115. For example, the edge computing platform 215-a may adjust ad bidding based on the location of the wireless device 115, or characteristics of the user (e.g., based on a subject of visual interest to the user).

In some cases, the input/output manager 315 may direct more than one I/O device 320. For example, the edge computing platform 215-a may implement smart tags that identify individual objects or groups of objects (e.g., items on a shelf may each be associated with respective tags, such as individual lights). In one scenario, the edge computing device 145-b may be located in a certain section of a library and the receive information indicating that an individual is interested in particular subject (e.g., the individual is looking up the particular subject on their wireless device 115). Accordingly, the input/output manager 315 may analyze the received information and instruct smart tags (e.g., bookshelf LEDs) associated with the particular subject to turn on. In some examples, the input/output manager 315 may provide directions to a desired object by activating flooring lights (e.g., lights embedded in floor tiles) so that a string of activated flooring lights leads to the desired object. Additionally or alternatively, the input/output manager 315 may activate direction indicators (e.g., arrows) on walls or ceilings.

In another example, a wireless device 115 may be looking for a specific book. The user may know the general location of the book (e.g., a book shelf) but may not be able to locate the book (e.g., the book have been incorrectly shelved). In such a scenario, the user may interact with the edge computing device 145-b to experience actual reality augmentation. For example, the user may send a picture of the library shelf to the edge computing device 145-b, along with an indication of the desired book (e.g., the title). The augmented reality coordinator 305 may analyze the picture and locate the desired book. The data annotation engine 310 may collaborate with the augmented reality coordinator 305 and transmitter 220-a to provide an annotated picture to the user that indicates (e.g., highlights) the location of the book on the book shelf.

In some cases, the data annotation engine 310 may also facilitate annotations that include language additions. For example, an annotation may overlay a picture of text in one language (e.g., from a museum information plaque) and provide a translation of the text in a second language. In some scenarios, the data annotation engine 310 may provide annotations of directions. For example, the data annotation engine 310 may overlay directions or instructions over an image of a map (i.e., map annotations). The directions may specify a route to a particular destination. In some cases, the annotation over the image of the map may include additional information about the area, such as historical sites or dangerous areas to avoid.

In some cases, the decisions of the input/output manager 315 may be based on audible information. In one example, an input/output sensor at a store may send information indicating that a customer has a question about a certain product. For example, a microphone may detect a conversation between two customers regarding the product and relay that information to the augmented reality coordinator 305. The augmented reality coordinator 305 may collaborate with the input/output manager 315 to alert and direct a sales representative (e.g. via a wireless device, a visual display, or audible prompt) to the customers.

The data annotation engine 310 may be responsible for providing annotation for text, images, videos, or other types of data. The annotation may be appended to data that is transmitted to a wireless device 115 or a display device within hyper proximity to the edge computing device 145-b. For example, a user of a wireless device 115 may take a picture of a painting at a museum and send the image to the edge computing device 145-b. The edge computing device 145-b may obtain information regarding the painting (e.g., origin, artist, technique, price, history, etc.) and, using the data annotation engine 310 and the transmitter 220-a, send the image back with the information annotated over the data. In one aspect, the data annotation engine 310 may include directions in an annotation. For instance, the data annotation engine 310 of an edge computing device 145-b in the spice section of a grocery store may receive a request from a user's wireless device 115 that indicates the user is interested in finding a specific spice. The request may be a text (e.g., the name of the spice) or image (e.g., a picture of the spice). The data annotation engine 310 may provide directions (e.g., 10 feet ahead, west aisle, third shelf) to the specific spice in an annotated version of the request that is transmitted to the user's wireless device 115. In another example, the data annotation engine 310 may provide language additions. For instance, the data annotation engine may provide an annotated version of an image of a menu in a different language (e.g., the menu may be written in Chinese and the annotation may include the translation of the menu in English).

Figure 4:
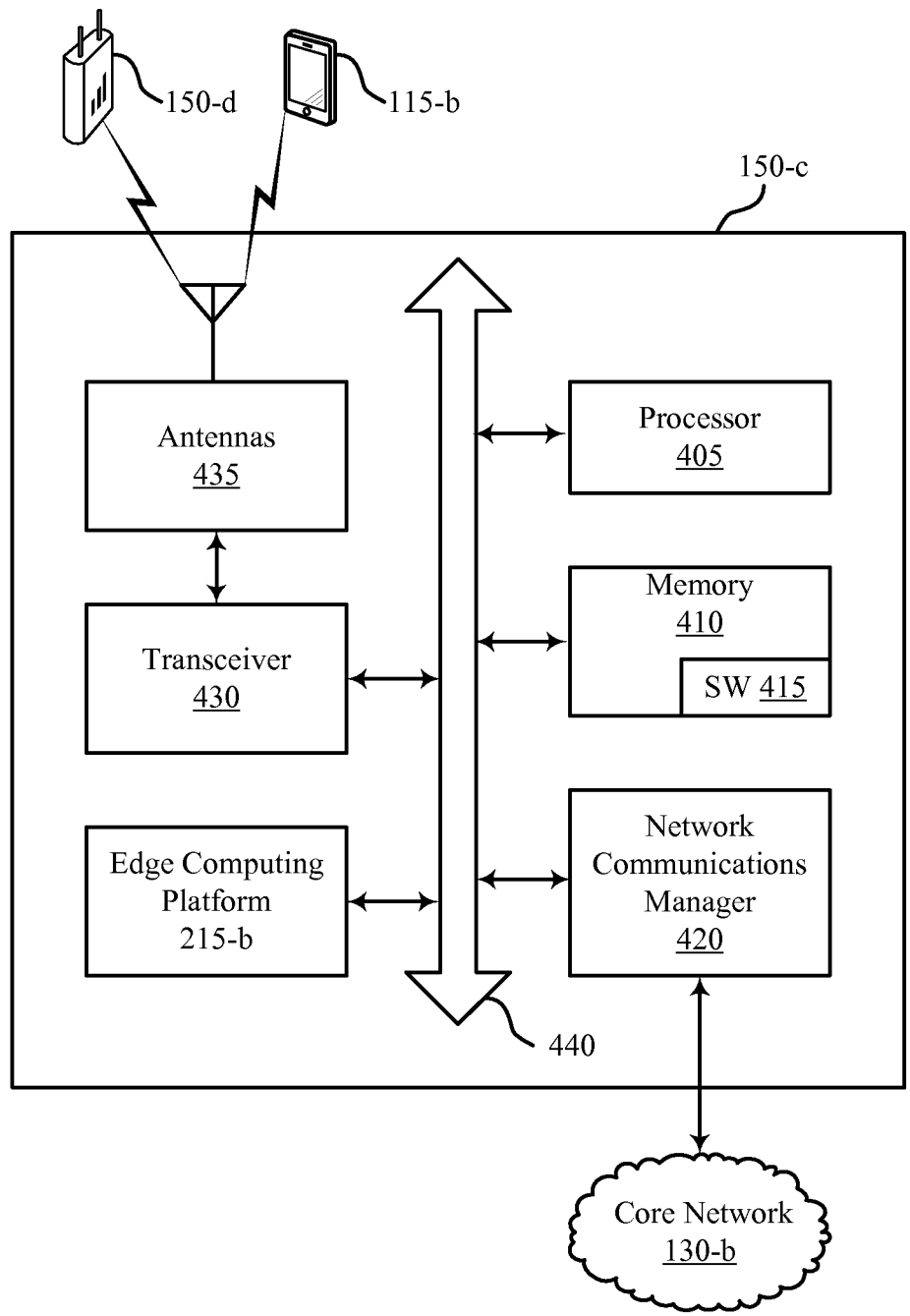
FIG. 4 shows a diagram that illustrates a device configured for wireless communication in accordance with various aspects of the present disclosure.

FIG. 4 shows a diagram 400 that illustrates a small cell base station 150-c configured for wireless communication in accordance with various aspects of the present disclosure. The small cell base station 150-c may provide edge computing resources via an edge computing device co-located with the small cell base station 150-c. The small cell base station 150-c may communicate with I/O devices, and/or small cell base station 150-d, and/or wireless device 115-b to augment actual reality. In some aspects, the small cell base station 150-c may be an example of the edge computing devices 145 described with reference to FIGS. 1-3. The small cell base station 150-c may include a processor 405, a memory 410, a transceiver 430, antennas 435, and an edge computing platform 215-b. The edge computing platform 215-b may be an example of the edge computing platform 215 of FIGS. 2-3. In some examples, the small cell base station 150-c may also include a network communications manager 420. Each of processor 405, memory 410, transceiver 430, network communications manager 420, and edge computing platform 215-b may be in communication with each other, directly or indirectly, over at least one bus 440.

The memory 410 may include random access memory (RAM) and read-only memory (ROM). The memory 410 may also store computer-readable, computer-executable software (SW) code 415 containing instructions that are configured to, when executed, cause the processor 405 to perform various functions described herein to provide edge computing resources to wireless devices in communication with the small cell base station, for example as further described with reference to FIGS. 1A, 1B, 2, and 3. Alternatively, the code 415 may not be directly executable by the processor 405 but be configured to cause the edge computing platform 215-b (e.g., when compiled and executed) to perform functions described herein.

The processor 405 may include an intelligent hardware device (e.g., a central processing unit (CPU), a microcontroller, an ASIC, etc.). The processor 405 may process information received through the transceiver 430 and/or the network communications manager 420. The processor 405 may also process information to be sent to the transceiver 430 for transmission through the antennas 435 and/or to the network communications manager 420. The processor 405 may handle, alone or in connection with the edge computing platform 215-b, various aspects related to providing edge computing resources to wireless devices connected to the small cell base station 150-c.

The transceiver 430 may include a modem configured to modulate packets and provide the modulated packets to the antennas 435 for transmission, as well as to demodulate packets received from the antennas 435. The transceiver 430 may be implemented as at least one transmitter module and at least one separate receiver module. The transceiver 430 may be configured to communicate bi-directionally, via the antennas 435, with at least one wireless device 115 as illustrated in FIGS. 1A and 1B, for example. The small cell base station 150-c may typically include multiple antennas 435 (e.g., an antenna array). The small cell base station 150-c may communicate with a core network 130-b through the network communications manager 420. The small cell base station 150-c may communicate with other small cell base stations 150 using the transceiver 430 and antennas 435.

The components of small cell base station 150-c may be configured to implement aspects discussed above with reference to FIGS. 1A, 1B, 2, and 3, and those aspects are not repeated here for the sake of brevity. Moreover, the components of the small cell base station 150-c may be configured to implement aspects discussed below with respect to FIGS. 5-12 and those aspects are not repeated here also for the sake of brevity.

Figure 5:
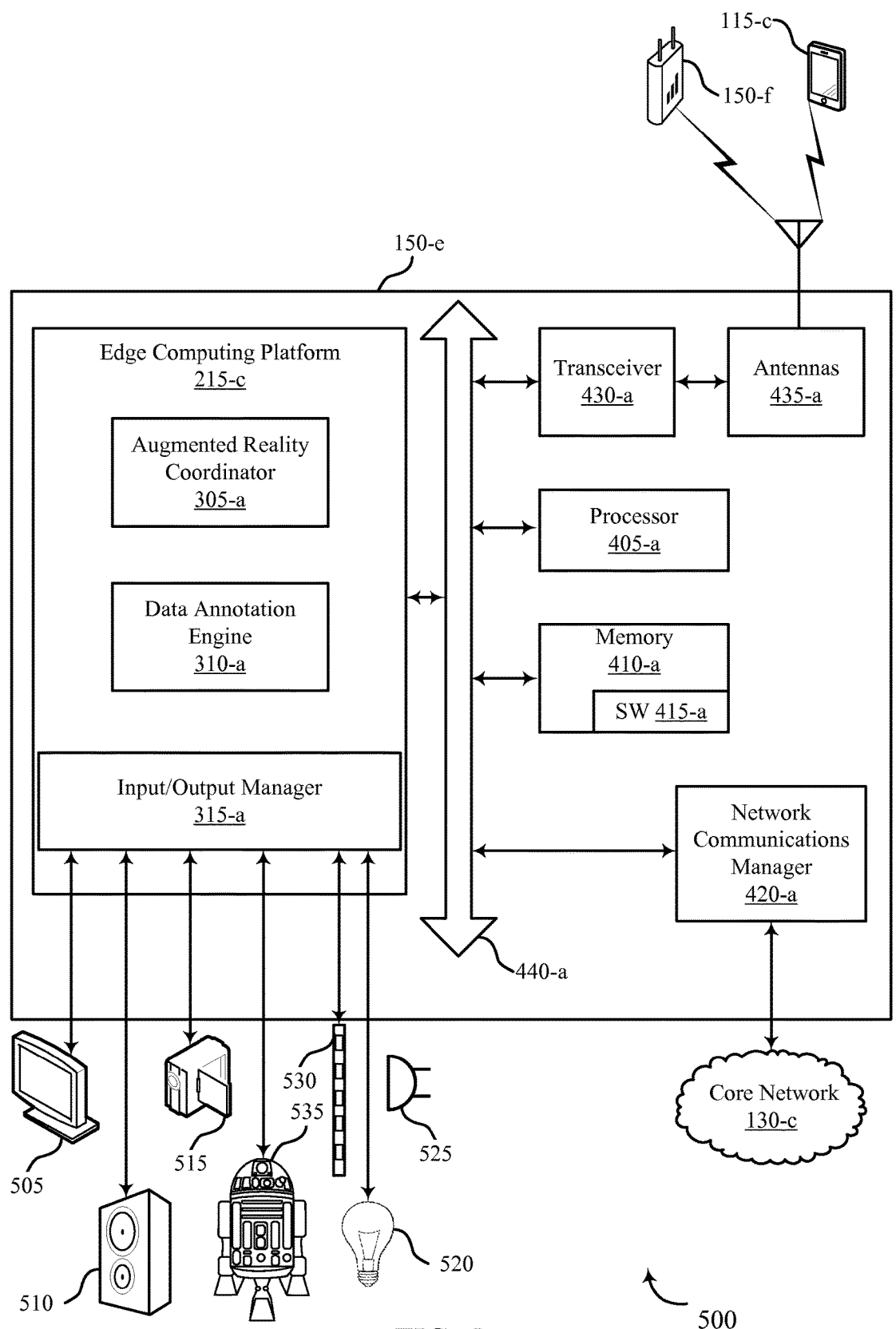
FIG. 5 shows a block diagram of a wireless communications system that supports an edge computing device, in accordance with various aspects of the present disclosure.

FIG. 5 shows a block diagram of a wireless communications system 500 that supports an edge computing device, in accordance with various aspects of the present disclosure. Wireless communications system 500 may facilitate and support the augmentation of actual reality. Wireless communications system 500 includes a small cell base station 150-e, which may be an example of aspects of a small cell base station 150 described with reference to FIGS. 1-4. Small cell base station 150-e may include a transceiver 430-a, antennas 435-a, a processor 405-a, a memory 410-a, including SW 415-a, and a network communications manager 420-a, each of which may implement the features described with reference to FIG. 5, and each of which may communicate, directly or indirectly, with one another (e.g., over bus 440-a). 420-a may provide connectivity between small cell base station 150-e and core network 130-c. Small cell base station 150-*e* may also include an edge computing platform 215-*c*, which may be an example of an edge computing platform described with reference to FIGS. 2-4.

The augmented reality coordinator 305-*a* may receive inputs from external entities, such as wireless device 115-*c* or small cell base station 150-*f*, regarding aspects of the surroundings or environment within the footprint of small cell base station 150-*e*. In certain cases, the input may be the physical operating context of the wireless device 115-*c*. The physical operating context of a wireless device may be information pertaining to the location or position of the wireless device 115-*c* and/or the behavior of the wireless device 115-*c* associated with that location or position. For example, the physical operating context of a wireless device 115 may include information that indicates that the wireless device 115 is in the soup aisle of a grocery store and is looking up soups that use certain ingredients. In some aspects, the input may be a request for content made by the wireless device 115-*c*. Additionally or alternatively, the augmented reality coordinator 305-*a* may receive information from sensor devices such as camera 515 or microphone 525. In some cases, the information received from sensors may indicate the physical operating context of a wireless device 115. The augmented reality coordinator 305-*a* may receive the inputs or information via collaboration with transceiver 430-*a*, antennas 435-*a*, and input/output manager 315-*a*.

Using the received information, the augmented reality coordinator 305-*a* may, in conjunction with the input/output manager 315-*a*, determine the physical operating context of a wireless device 115. Additionally or alternatively, the small cell base station 150-*e* may facilitate actions by external devices (e.g., I/O devices such as display screen 505, speaker 510, LEDs 530, robot 535, or light 520) that augment actual reality. For example, the augmented reality coordinator 305-*a* may analyze the received information (e.g., scan a content request from wireless device 115-*c* or analyze a conversation reported by microphone 525) and determine an appropriate augmented reality response. The augmented reality coordinator 305-*a* may coordinate with the input/output manager 315-*a* to determine or select an external entity and action suitable for conveying the response. Based on the selection, the input/output manager 315-*a* may communicate with the appropriate output device (e.g., the display screen 505) to perform actions that augment reality (e.g., display an ad specific to the venue). For example, the input/output manager 315-*a* may communicate instructions to the robot 535 that cause the robot 535 to perform a certain task (e.g., lead an individual to a particular location). The robot 535 may include one or more I/O devices such as a screen, camera, microphone, LEDs, lights, etc.

In some cases, the augmented reality coordinator may collaborate with the data annotation engine 310-*a* to provide annotated data to a wireless device 115. For example, the augmented reality coordinator may receive a data (e.g., an image) and information from wireless device 115-*c* and communicate with the data annotation engine 310-*a* to determine the appropriate text for the annotation. Accordingly, edge computing platform 215-*c* may send annotated data to wireless device 115-*c*.

Figure 6:
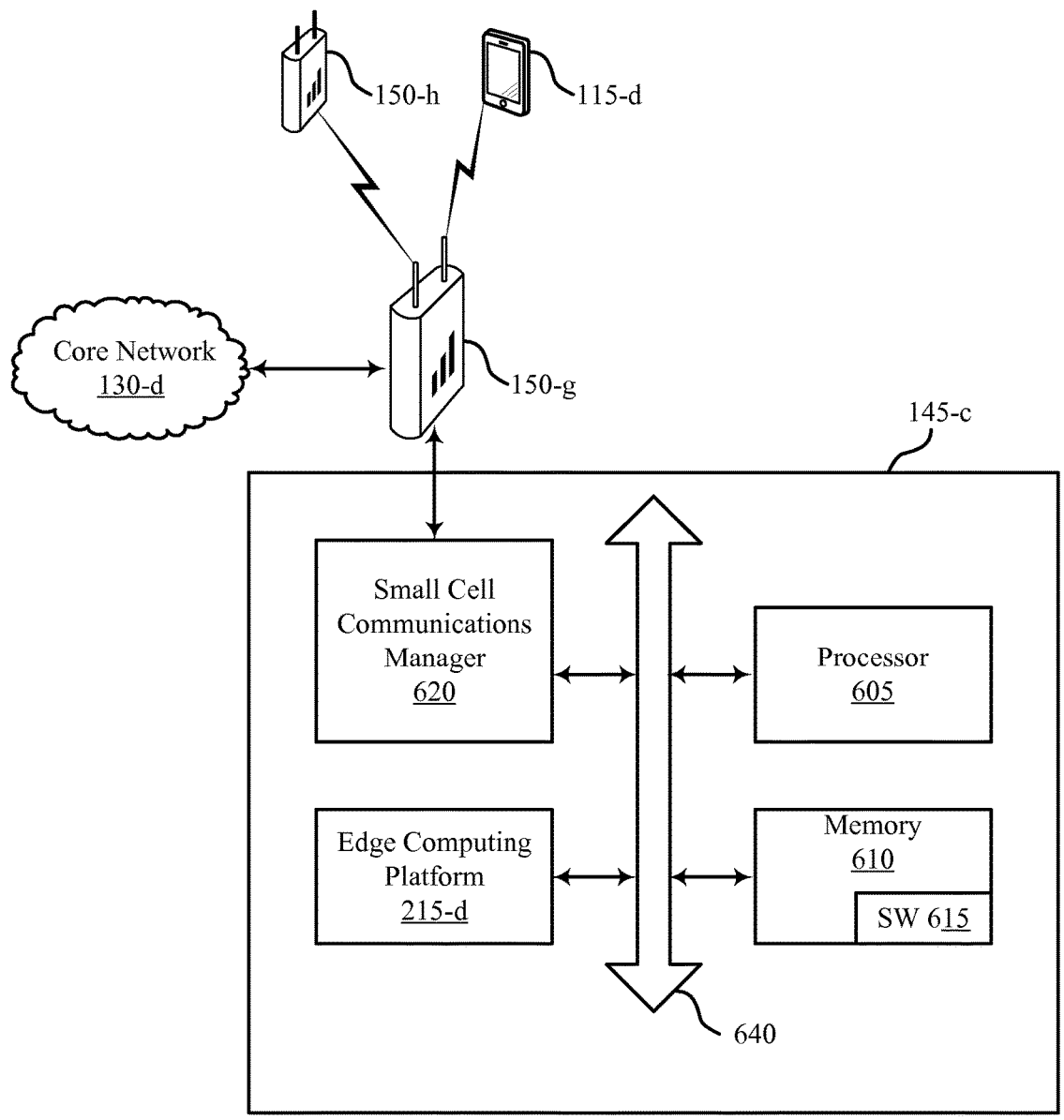
FIG. 6 shows a diagram that illustrates a device configured for providing edge computing resources, in accordance with various aspects of the present disclosure.

FIG. 6 shows a diagram 600 that illustrates an edge computing device 145-*c* configured for providing edge computing resources co-located with a small cell base station 150-*g*, in accordance with various aspects of the present disclosure. In FIG. 6, the small cell base station 150-*g* is physically distinct from the edge computing device 145-*c*. Edge computing device 145-*c* may include a processor 605, a memory 610, a small cell communications manager 620, and an edge computing platform 215-*b*.

The edge computing platform 215-*d* may be one or more aspects of an example of the edge computing platform 215 of FIGS. 2-5. Edge computing platform 215-*d* may communicate with a core network 130-*d* via the small cell communications manager 620 of the edge computing device 145-*c*. In some aspects, the small cell base station 150-*g* and the small cell base station 150-*h* may be an example of the small cell base stations 150 of FIGS. 1A-1B and 4-5 and wireless device 115-*d* may be an example of the wireless devices 115 of FIGS. 1A-1B and 4-5.

The components of edge computing device 145-*c* may be configured to implement aspects discussed above with reference to FIGS. 1A-5, and those aspects may not be repeated here for the sake of brevity.

The processor 605 may be an example of the processor 405 of FIG. 4. The processor 605 may include an intelligent hardware device (e.g., a CPU, a microcontroller, an ASIC, etc.). The processor 605 may process information received through the small cell communications manager 620 or edge computing platform 215-*d*. The processor 605 may also process information to be sent to the transceiver 430 for transmission through the small cell communications manager 620. The processor 605 may handle, alone or in connection with the edge computing platform 215-*d*, various aspects related to providing edge computing resources to wireless devices connected to the small cell base station 150-*g*. In some examples, the processor 605 is the edge computing platform 215-*d*.

The memory 610 may be an example of the memory 410 of FIG. 4. The memory 610 may store computer-readable, computer-executable software (SW) code 615 containing instructions that are configured to, when executed, cause the processor 605 to perform various functions described herein to provide edge computing resources to wireless devices connected to a small cell, for example as further described with reference to FIGS. 1A-5. Alternatively, the code 615 may not be directly executable by the processor 605 but be configured to cause the computer (e.g., when compiled and executed) to perform functions described herein.

Moreover, the components of the edge computing device 145-*c* may be configured to implement aspects discussed below with respect to respect to FIGS. 7-12 and those aspects may not be repeated here also for the sake of brevity.

Figure 7:
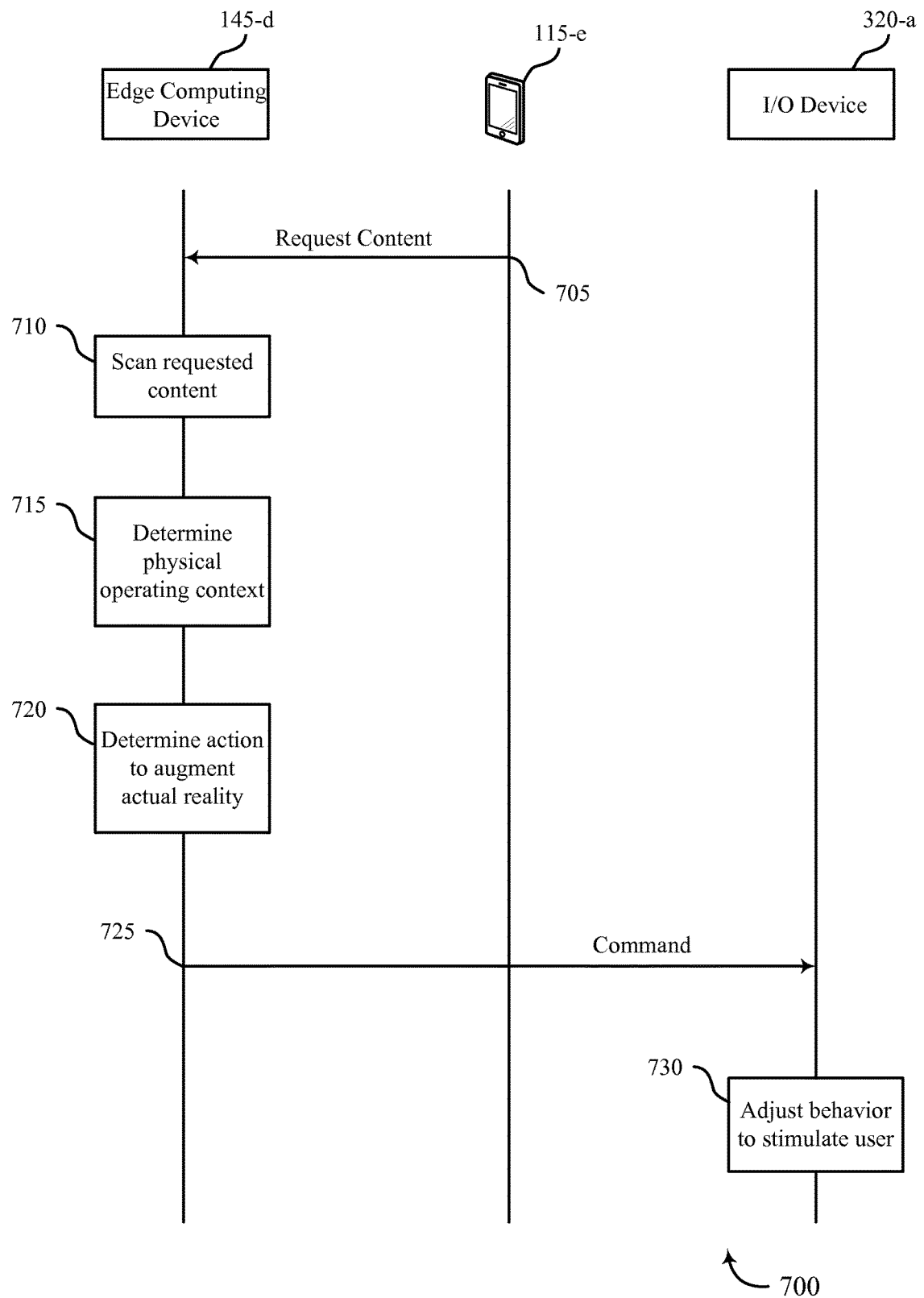
FIG. 7 illustrates an example of a process flow that supports edge computing resources co-located with a small cell base station, in accordance with various aspects of the present disclosure.

FIG. 7 illustrates an example of a process flow 700 that supports edge computing resources for augmenting actual reality in accordance with various aspects of the present disclosure. Process flow 700 may include an edge computing device 145-*d*, a wireless device 115-*e*, and an I/O device 320-*a*, each of which may perform the respective functions described with reference to FIGS. 1-6. The edge computing device 145-*d* may be co-located with a small cell base station 150. The edge computing device 145-*d* may have a coverage area or service footprint that enables service for communication devices that are within hyper proximity to the edge computing device 145-*d*; thus, the edge computing device 145-*d* may be aware of intimate details and aspects of the location in which the edge computing device 145-*d* is situated. Accordingly, the edge computing device 145-*d* may provide finer-granularity instructions to communication devices (e.g., wireless device 115 or I/O devices 320) than larger cells (e.g., a macro cell). Wireless device 115-*e* and I/O device 320-*a* may both be located within hyper-proximity to edge computing device 145-*d*.

At 705, the wireless device 115-*e* transmit a request for content. Edge computing device 145-*d* may receive the request for content. The request may be intended for edge computing device 145-*d*, or for another entity (e.g., edge computing device 145-*d* may serve as a relay point and communicate the request to another entity). Regardless of the final destination of the request, at 710 the edge computing device 145-*d* may scan the requested content to determine the interests of the user of the wireless device 115-*e* or the operating context of the wireless device 115-*e*. For example, the edge computing device 145-*d* may determine that the wireless device 115 has looked up camping gear. Based at least in part on the information obtained from the scan, the edge computing device 145-*d* may determine the physical operating context of the wireless device 115-*e* (e.g., how the wireless device 115-*e* is being used within the coverage area of edge computing device 145-*d*). In some cases, the edge computing device 145-*d* may use information from I/O devices 320 to determine the physical operating context of the wireless device 115-*e*. For example, the edge computing device 145-*d* may obtain data from a thermometer that indicates the ambient temperature of the location. In some examples, the data may be from a previous measurement that has been stored, either at the I/O device or the edge computing device 145-*d*.

At 720, the edge computing device 145-*d* may determine an action to augment actual reality (e.g. aspects of the environment perceivable by the unaided senses of the user of the wireless device 115-*e*). For example, the edge computing device 145-*d* may decide to change an advertisement on a display screen near the wireless device (e.g. to one featuring outdoor gear). Thus, a stimulus provided to an individual may be in response to an aspect of the environment detected by a device (e.g., wireless device 115-*e* or an I/O device 320). The action to generate the stimulus may be determined by analyzing the location of the edge computing device 145-*d*, the positioning of the wireless device 115-*e*, and the content of the request from 705. In some cases, inputs from I/O devices 320 may contribute to the selection of the action. Once the action has been determined, the edge computing device 145-*d* may send a command to the I/O device 320-*a* indicating the action to be performed. Accordingly, the I/O device 320-*a* may modify its behavior to stimulate the user of wireless device 115-*e* according to the instructions conveyed by the command. For example, the I/O device 320-*a* may be a display screen that switches advertisements to target the predicted interests of an individual.

Figure 8:
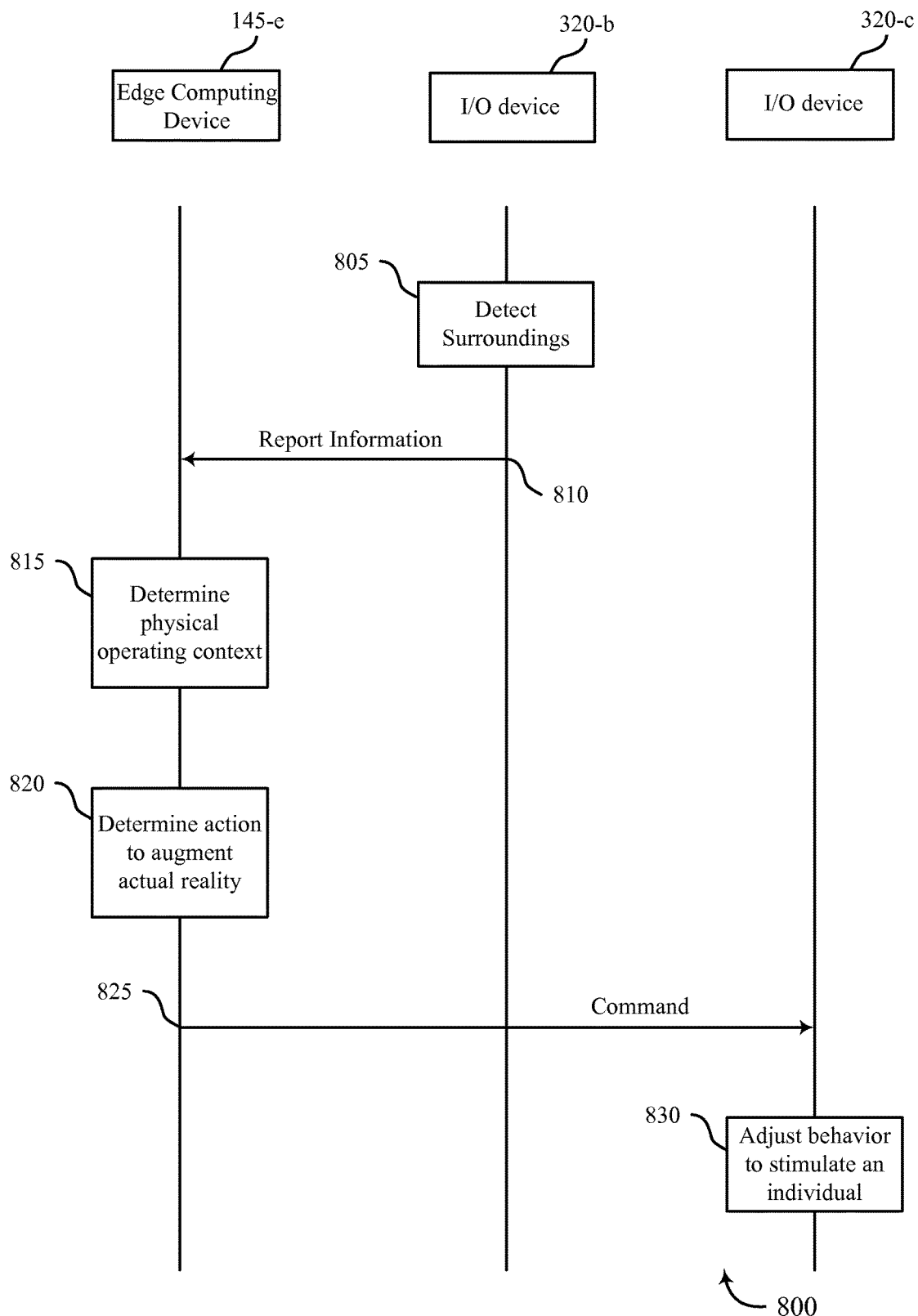
FIG. 8 illustrates an example of a process flow that supports edge computing resources co-located with a small cell base station, in accordance with various aspects of the present disclosure.

FIG. 8 illustrates an example of a process flow 800 that supports edge computing resources for augmenting actual reality in accordance with various aspects of the present disclosure. Process flow 800 may include an edge computing device 145-*e*, an I/O device 320-*b*, and an I/O device 320-*c*, each of which may perform the respective functions described with reference to FIGS. 1-7. The edge computing device 145-*e* may have a coverage area or footprint that enables service for communication devices that are within hyper proximity to the edge computing device 145-*e*.

At 805, the I/O device 320-*b* may detect aspects of the surroundings (e.g., the I/O device may include sensing components such a microphones, thermometers, light sensors, etc.). At 810, the I/O device 320-*b* may transmit, and the edge computing device 145-*e* may receive, a report that includes information indicating aspects of the surroundings as sensed by I/O device 320-*b*. Based at least in part on this report, the edge computing device 145-*e* may determine the physical operating context of a wireless device 115 (not shown) in the vicinity. The physical operating context of the wireless device 115 may also be based on input received from the wireless device 115 or another entity (e.g., another edge computing device 145, a small cell base station 150, or another I/O device 320).

At 820, the edge computing device 145-*e* may determine an action to augment actual reality by stimulating an individual within hyper proximity to the edge computing device 145-*e*. The action may be based at least in part on the physical operating context of the wireless device 115. Alternatively, in some cases, the edge computing device 145-*e* may determine the stimulus without determining the physical operating context of the wireless device 115; that is, the action may be independent of a wireless device 115. At 825, the edge computing device 145-*e* may send a command to the I/O device 320-*c*. The command may indicate the actions to be taken by the I/O device 320-*a*. Accordingly, at 830, the I/O device 320-*a* may adjust its behavior to stimulate an individual; in other words, the I/O device may perform the actions indicated by the command. In some cases, the I/O device 320 that receives the command may be the same I/O device 320 that sent the report.

Figure 9:
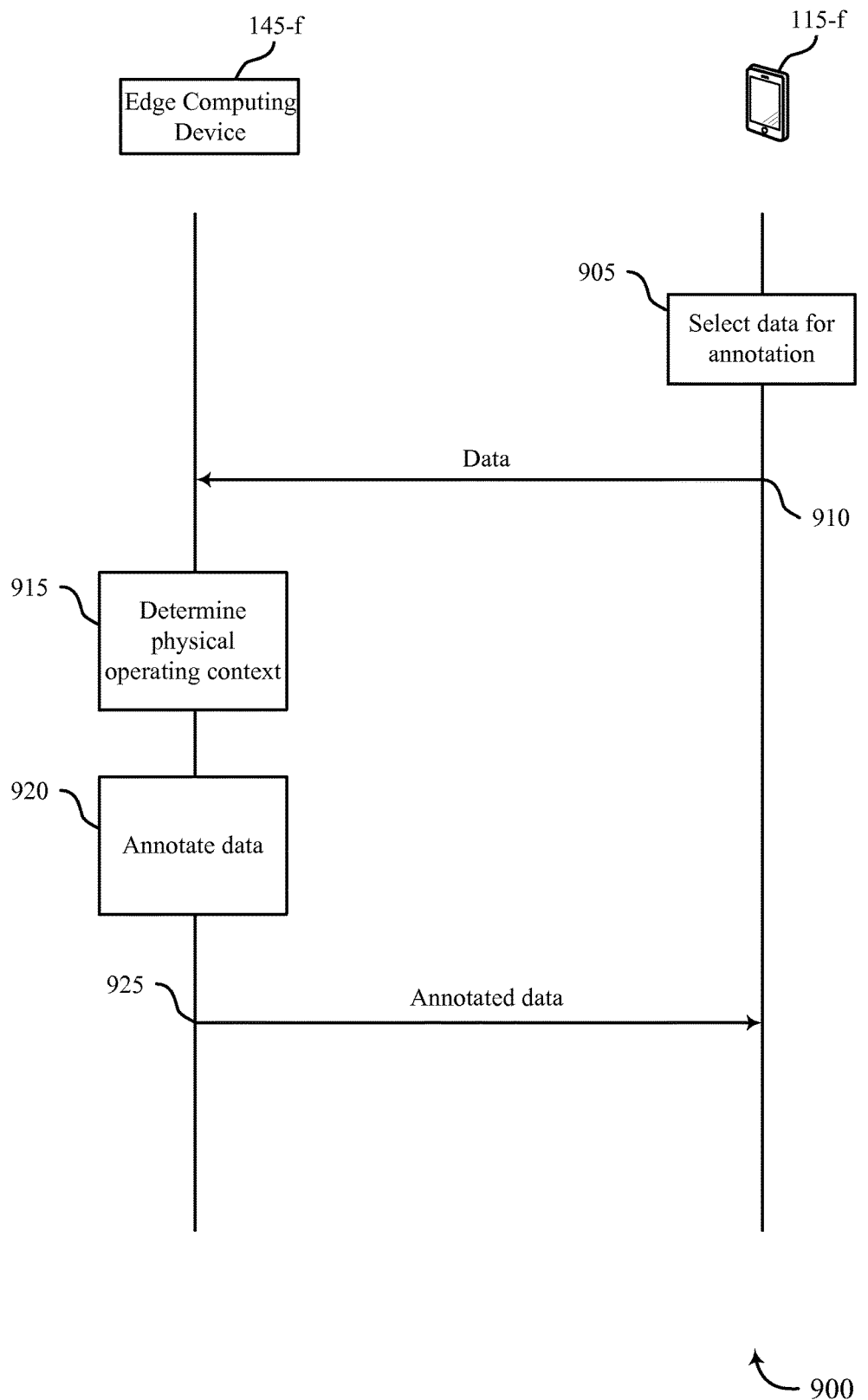
FIG. 9 illustrates an example of a process flow that supports edge computing resources co-located with a small cell base station, in accordance with various aspects of the present disclosure.

FIG. 9 illustrates an example of a process flow 900 that supports edge computing resources for augmenting actual reality in accordance with various aspects of the present disclosure. Process flow 900 may include an edge computing device 145-*f* and a wireless device 115-*f*, each of which may perform the respective functions described with reference to FIGS. 1-6. The wireless device 115-*f* may be in hyper proximity to the edge computing device 145-*f* and a small cell base station 150.

At 905, the wireless device 115-*f* may select certain data for annotation. For example, the use of the wireless device 115-*f* may select an image, text, or picture. At 910, the wireless device 115-*f* may transmit the data intended for annotation to the edge computing device 145-*f*. Proceeding to 915, the edge computing device 145-*f* may determine the physical operating context of the wireless device 115-*f*. The physical operating context of the wireless device 115-*f* may be based on the received data, other information from the wireless device 115-*f*, or information from other communication devices (e.g., small cells 150 or I/O device 320). At 920, the edge computing device 145-*f* may determine and apply the annotation to the data (e.g., by overlaying text on an image). The annotation may be based at least in part on the received data. The annotation may be based at least in part on the physical operating context of the wireless device 115-*f*. In some cases, the annotation may be associated with information gathered from external sources. In certain aspects, annotating the data includes annotating the data content with advertising. Proceeding to 925, the edge computing device 145-*f* may transmit the annotated data to the wireless device 115-*f*.

Figure 10:
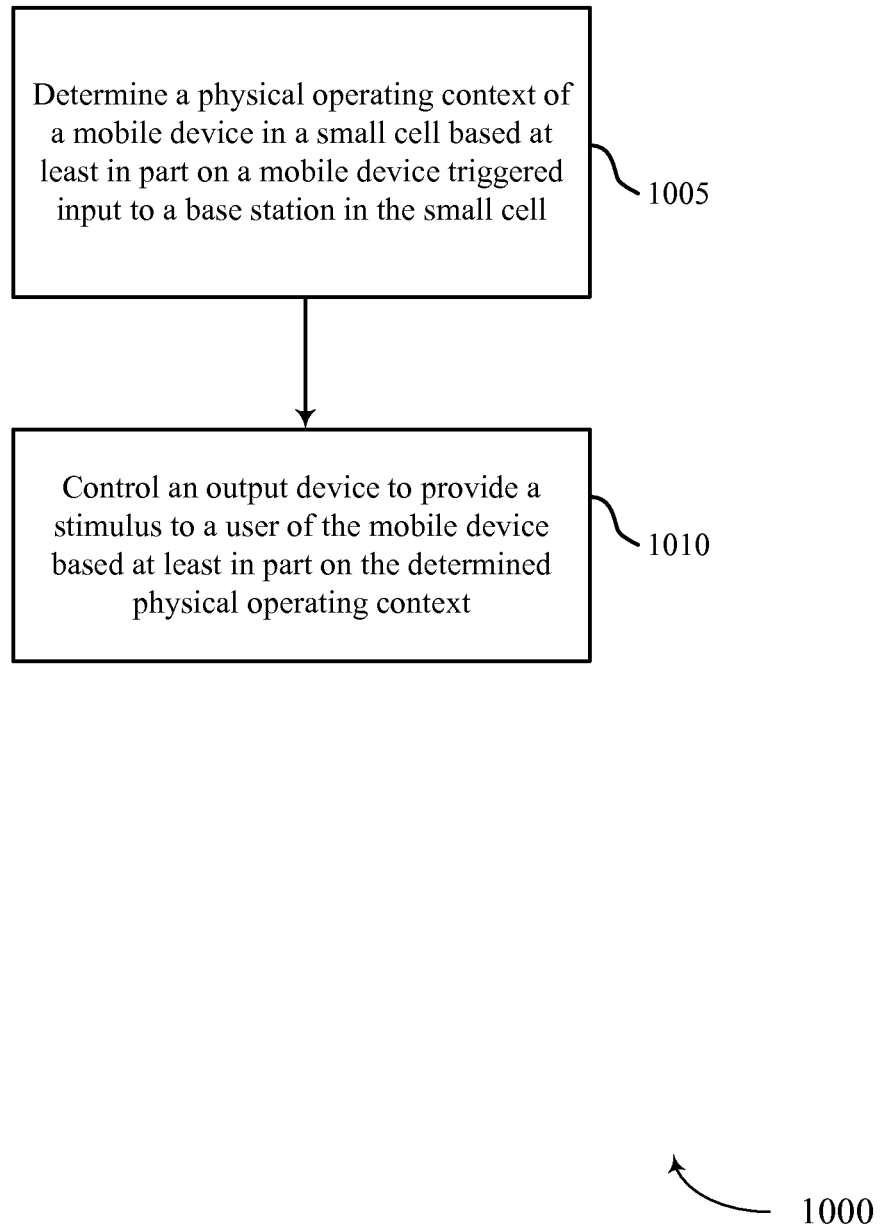
FIG. 10 illustrates a method for wireless communication in accordance with various aspects of the present disclosure.

FIG. 10 is a flow chart illustrating an example of a method 1000 for wireless communication, in accordance with various aspects of the present disclosure. The operations of method 1000 may be implemented by an edge computing device or its components as described with reference to FIGS. 1-9. For example, the operations of method 1000 may be performed by an edge computing platform as described with reference to FIGS. 2-6. In some examples, a device may execute a set of codes to control the functional elements of the device to perform the functions described below. Additionally or alternatively, the device may perform aspects the functions described below using special-purpose hardware.

At 1005 an edge computing device may determine the physical operating context of a mobile device in a small cell based at least in part on an input to a base station in the small cell that is triggered by a mobile device. The mobile device that triggers the input to the base station may be the same mobile device whose physical operating context is determined. The base station may be co-located with the edge computing device. In some cases, the wireless communication resources of the base station are housed in a first module and the edge computing device is housed in a second module. In certain aspects, the second module is in communication with the first module. The first module and the second module may be co-located. The small cell may be a picocells, a femtocell, a microcell, or a Wi-Fi access point. In some examples, the small cell includes a WWAN transceiver and a WLAN transceiver. At 1010, the edge computing device may control an output device (e.g., an I/device) to provide a stimulus to a user of the mobile device based at least in part on the determined physical operating context. In certain cases, the output device provides information to the edge computing device that the edge computing device leverages to determine the physical operating context of the mobile device. The output device may be a display, one or more lights, an array of lights, or a printer.

Figure 11:
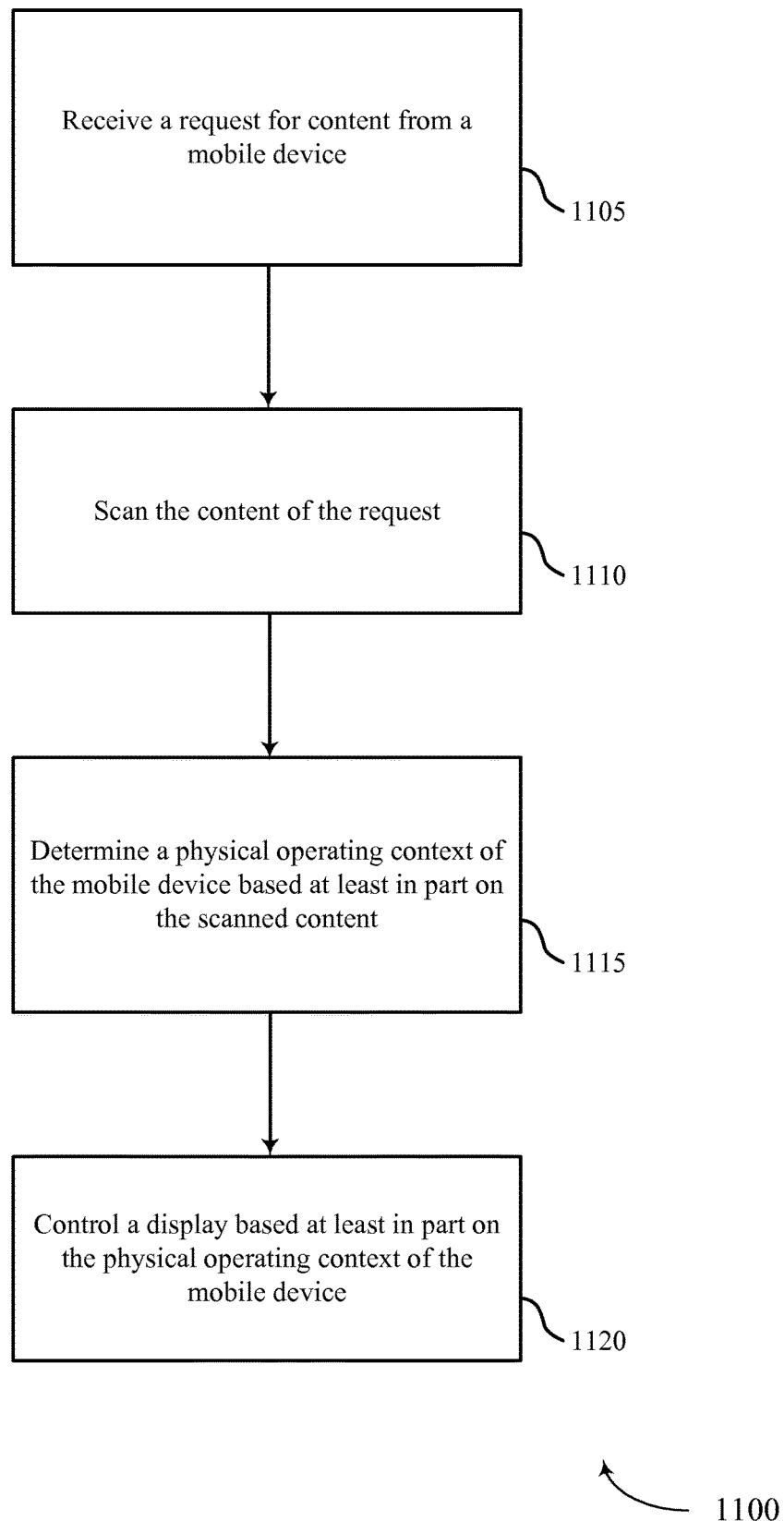
FIG. 11 illustrates a method for wireless communication in accordance with various aspects of the present disclosure.

FIG. 11 shows a flowchart illustrating a method 1100 for wireless communication, in accordance with various aspects of the present disclosure. The operations of method 1100 may be implemented by an edge computing device or its components as described with reference to FIGS. 1-9. For example, the operations of method 1100 may be performed by an edge computing platform as described with reference to FIGS. 2-6. In some examples, a device may execute a set of codes to control the functional elements of the device to perform the functions described below. Additionally or alternatively, the device may perform aspects the functions described below using special-purpose hardware. The method 1100 may also incorporate aspects of method 1000 of FIG. 10.

At 1105 the edge computing device in a small cell may receive a request for content from a mobile device in the small cell. The request for content may be intended for the edge computing device or for a different target communication device (e.g., a base station co-located with the edge computing device in the small cell). In some cases, the request for content includes a query for information. At 1110, the edge computing device may scan the content of the request. For example, the edge computing device may analyze information conveyed by the request. Proceeding to 1115, the edge computing device may determine the physical operating context of the wireless device based at least in part on the content of the request. At 1120, the edge computing device may control a display based at least in part on the physical operating context of the mobile device. The display may be within the small cell.

Figure 12:
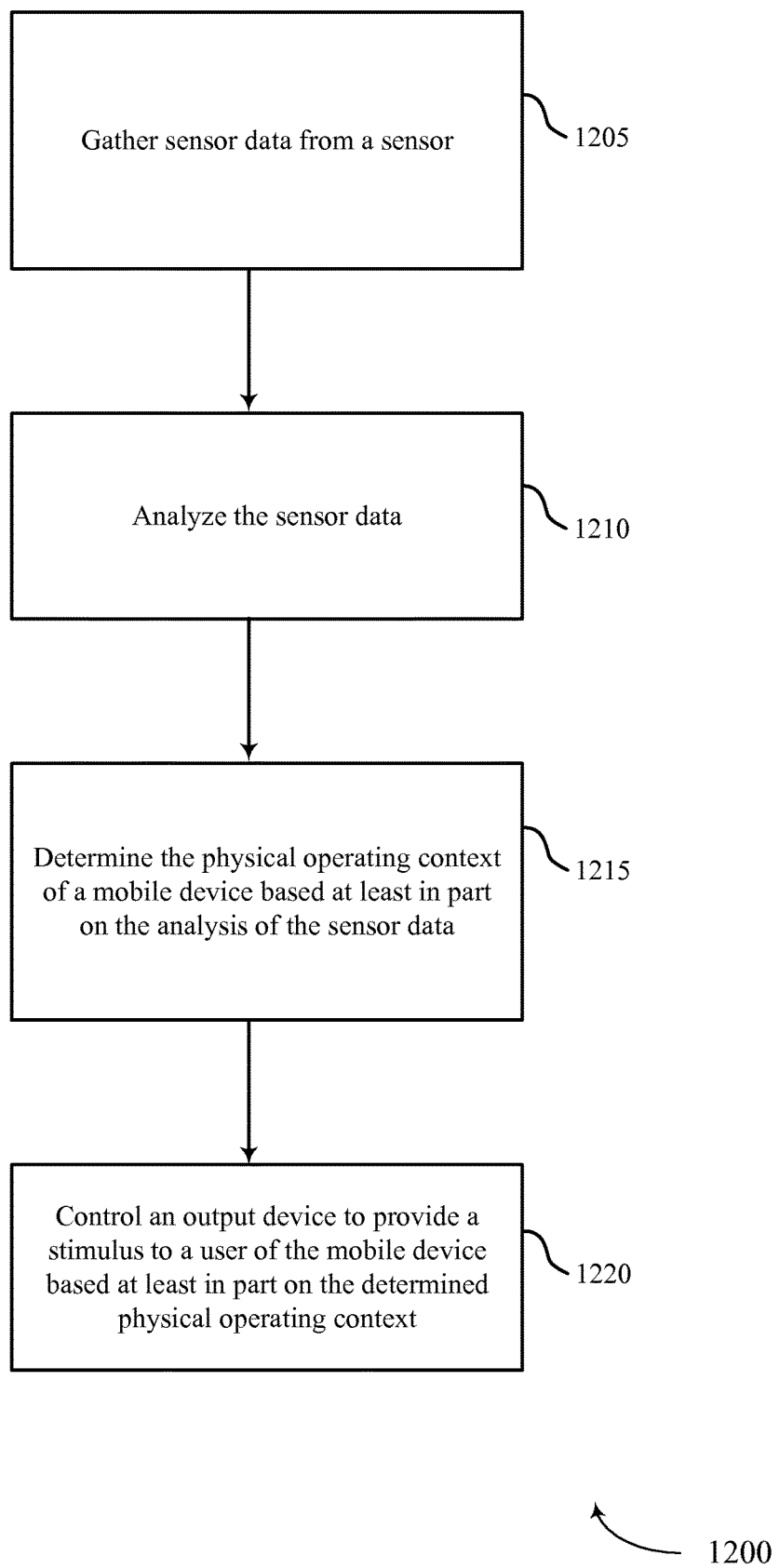
FIG. 12 illustrates a method for wireless communication in accordance with various aspects of the present disclosure.

FIG. 12 shows a flowchart illustrating a method 1200 for wireless communication, in accordance with various aspects of the present disclosure. The operations of method 1200 may be implemented by an edge computing device or its components as described with reference to FIGS. 1-9. For example, the operations of method 1200 may be performed by an edge computing platform as described with reference to FIGS. 2-6. In some examples, a device may execute a set of codes to control the functional elements of the device to perform the functions described below. Additionally or alternatively, the device may perform aspects the functions described below using special-purpose hardware. The method 1200 may also incorporate aspects of methods 1000 and 1100 of FIGS. 10 and 11.

At 1205, the edge computing device may gather sensor data from a sensor (e.g., an I/O device). The edge computing device and the sensor may be located within a small cell. At 1210 the edge computing device may analyze the sensor data. The sensor data may be gathered periodically, upon request, or based on an external trigger (e.g., a change in an aspect of the surroundings of the sensor). The sensor may be a microphone, a temperature sensor, a light sensor, or a camera. Proceeding to 1215, the edge computing device may determine the physical operating context of mobile device within the small cell. The physical operating context may be based at least in part on the analysis of the sensor data. In some cases, the physical operating context may be based on information from more than one sensor. At 1220, the edge computing device may control an output device within the small cell to provide a stimulus to a user of the mobile device. The stimulus may be based at least in part on the physical operating context of the mobile device.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
    determining, at an edge computing device, a physical operating context of a mobile device in a small cell based at least in part on a mobile device triggered input to a base station in the small cell, the determined physical operating context comprising a location of the mobile device within the small cell, wherein the base station is co-located with the edge computing device, and wherein the mobile device is in wireless communication with the edge computing device via the wireless resources of the base station; and
    controlling, by the edge computing device, an output device to provide a stimulus to a user of the mobile device based at least in part on the determined physical operating context.

2. The method of claim 1, wherein controlling the output device is further based at least in part on a request for content made by the mobile device in the small cell, the method further comprising:
    scanning a content of the request for content.

3. The method of claim 1, wherein controlling the output device comprises:
    controlling a display based at least in part on a proximity of the mobile device to the display.

4. The method of claim 1, wherein determining the physical operating context of the mobile device comprises:
    gathering sensor data from a sensor in the small cell; and
    analyzing the sensor data to determine the physical operating context of the mobile device.

5. The method of claim 4, wherein the sensor is one or more of a microphone, a temperature sensor, a light sensor, or a camera.

6. The method of claim 1, further comprising:
    annotating data content based at least in part on the determined physical operating context; and
    transmitting the annotated data content to the mobile device.

7. The method of claim 6, wherein annotating the data content comprises annotating the data content with advertising.

8. The method of claim 1, wherein the output device comprises a display, one or more lights, an array of lights, a sign, or a printer.

9. The method of claim 1, wherein:
    wireless communication resources of the base station are housed in a first module; and
    the edge computing device is housed in a second module in communication with and co-located with the first module.

10. The method of claim 1, wherein the small cell comprises a wireless wide area network (WWAN) transceiver and a wireless local area network (WLAN) transceiver.

11. An apparatus for wireless communication at a wireless device, comprising:
    means for determining, at an edge computing device, a physical operating context of a mobile device in a small cell based at least in part on a mobile device triggered input to a base station in the small cell, the determined physical operating context comprising a location of the mobile device within the small cell, wherein the base station is co-located with the edge computing device, and wherein the mobile device is in wireless communication with the edge computing device via the wireless resources of the base station; and
    means for controlling, by the edge computing device, an output device to provide a stimulus to a user of the mobile device based at least in part on the determined physical operating context.

12. The apparatus of claim 11, wherein the means for controlling the output device is further based at least in part on a request for content made by the mobile device in the small cell, the apparatus further comprising:
    means for scanning a content of the request for content.

13. The apparatus of claim 11, wherein the means for controlling the output device comprises:
    means for controlling a display based at least in part on a proximity of the mobile device to the display.

14. The apparatus of claim 11, wherein the means for determining the physical operating context of the mobile device comprises:
  means for gathering sensor data from a sensor in the small cell; and
  the apparatus further comprising:
  means for analyzing the sensor data to determine the physical operating context of the mobile device.

15. The apparatus of claim 14, wherein the sensor is one or more of a microphone, a temperature sensor, a light sensor, or a camera.

16. The apparatus of claim 11, further comprising:
  means for annotating data content based at least in part on the determined physical operating context; and
  means for transmitting the annotated data content to the mobile device.

17. The apparatus of claim 16, further comprising:
  means for annotating the data content comprises annotating the data content with advertising.

18. The apparatus of claim 11, wherein the output device comprises a display, one or more lights, an array of lights, a sign, or a printer.

19. The apparatus of claim 11, wherein wireless communication resources of the base station are housed in a first module and the edge computing device is housed in a second module in communication with and co-located with the first module.

20. The apparatus of claim 11, wherein the small cell comprises a wireless wide area network (WWAN) transceiver and a wireless local area network (WLAN) transceiver.

21. An apparatus for communication at a wireless device, comprising:
  a processor;
  memory in electronic communication with the processor; and
  instructions stored in the memory, wherein the instructions are executable by the processor to:
  determine, at an edge computing device, a physical operating context of a mobile device in a small cell based at least in part on a mobile device triggered input to a base station in the small cell, the determined physical operating context comprising a location of the mobile device within the small cell, wherein the base station is co-located with an edge computing device, and wherein the mobile device is in wireless communication with the edge computing device via the wireless resources of the base station; and
  control, by the edge computing device, an output device to provide a stimulus to a user of the mobile device based at least in part on the determined physical operating context.

22. The apparatus of claim 21, wherein the instructions to control the output device are further based at least in part on a request for content made by the mobile device in the small cell, and wherein the instructions are further executable by the processor to:
  scan a content of the request for content.

23. The apparatus of claim 21, wherein the instructions to control the output device comprise instructions to:
  control a display based at least in part on a proximity of the mobile device to the display.

24. The apparatus of claim 21, wherein the instructions to determine the physical operating context of the mobile device comprise instructions to:
  gather sensor data from a sensor in the small cell; and
  analyze the sensor data to determine the physical operating context of the mobile device.

25. The apparatus of claim 21, wherein the instructions are executable by the processor to:
  annotate data content based at least in part on the determined physical operating context; and
  transmit the annotated data content to the mobile device.

26. A non-transitory computer-readable medium storing code for communication at a wireless device, the code comprising instructions executable to:
  determine, at an edge computing device, a physical operating context of a mobile device in a small cell based at least in part on a mobile device triggered input to a base station in the small cell, the determined physical operating context comprising a location of the mobile device within the small cell, wherein the base station is co-located with the edge computing device, and wherein the mobile device is in wireless communication with the edge computing device via the wireless resources of the base station; and
  control, by the edge computing device, an output device to provide a stimulus to a user of the mobile device based at least in part on the determined physical operating context.

27. The non-transitory computer-readable medium of claim 26, wherein the instructions to control the output device is further based at least in part on a request for content made by the mobile device in the small cell, and wherein the instructions are further executable to:
  scan a content of the request for content.

28. The non-transitory computer-readable medium of claim 26, wherein the instructions are further executable to:
  gather sensor data from a sensor in the small cell; and
  analyze the sensor data to determine the physical operating context of the mobile device.

29. The method of claim 1, wherein the small cell is one of a picocell, a femtocell, a microcell, or a Wi-Fi access point.

30. The apparatus of claim 11, wherein the small cell is one of a picocell, a femtocell, a microcell, or a Wi-Fi access point.

* * * * *